US008555334B2

(12) United States Patent
Asano

(10) Patent No.: US 8,555,334 B2
(45) Date of Patent: Oct. 8, 2013

(54) AUTHENTICATION SYSTEM, AUTHENTICATION APPARATUS, AUTHENTICATION METHOD AND AUTHENTICATION PROGRAM

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1319 days.

(21) Appl. No.: 11/457,049

(22) Filed: Jul. 12, 2006

(65) Prior Publication Data

US 2007/0016795 A1 Jan. 18, 2007

(30) Foreign Application Priority Data

Jul. 14, 2005 (JP) ................................. 2005-206051
Dec. 14, 2005 (JP) ................................. 2005-361116

(51) Int. Cl.
*G06F 21/00* (2013.01)
(52) U.S. Cl.
USPC .............................................. 726/2; 726/28
(58) Field of Classification Search
USPC .......................................... 726/1–10, 26–28
See application file for complete search history.

(56) References Cited

U.S. PATENT DOCUMENTS

| | | | | |
|---|---|---|---|---|
| 6,957,339 B2 * | 10/2005 | Shinzaki | ....................... | 713/186 |
| 7,568,222 B2 * | 7/2009 | Randle et al. | ..................... | 726/8 |
| 2001/0045451 A1 * | 11/2001 | Tan et al. | ....................... | 235/375 |
| 2003/0195859 A1 * | 10/2003 | Lawrence | ....................... | 705/75 |
| 2003/0197058 A1 * | 10/2003 | Benkert et al. | ................. | 235/380 |
| 2003/0200172 A1 * | 10/2003 | Randle et al. | .................... | 705/39 |
| 2006/0242691 A1 * | 10/2006 | Meister | ............................. | 726/9 |
| 2008/0086410 A1 * | 4/2008 | MacGuire | ....................... | 705/38 |

FOREIGN PATENT DOCUMENTS

| | | |
|---|---|---|
| JP | SHO 63-223277 | 9/1988 |
| JP | 2000-059323 | 2/2000 |
| JP | 2000-215279 | 8/2000 |
| JP | 2002-133343 | 5/2002 |
| JP | 2004-240645 | 8/2004 |
| JP | 2004-326509 | 11/2004 |
| JP | 2005-122266 | 5/2005 |

OTHER PUBLICATIONS

Japanese Office Action issued Jul. 26, 2011, for corresponding Japanese Appln. No. 2005-361116.

* cited by examiner

*Primary Examiner* — Darren B Schwartz
*Assistant Examiner* — John B King
(74) *Attorney, Agent, or Firm* — K&L Gates LLP

(57) ABSTRACT

An authentication system is provided. The authentication system includes: a storage section that stores association information where a plurality of instructions for individual data is associated with authentication methods which are to be used to authenticate a user (the individual data is previously allocated to a legitimate user individually); a selection section that selects, based on the association information, the authentication method corresponding to the instruction input by a user; and an authentication section that follows the authentication method selected to authenticate the user as the legitimate user based on a result of checking challenge data obtained from the user for the check against template data previously registered as authentication information for the legitimate user.

18 Claims, 18 Drawing Sheets

| OPERATION INSTRUCTIONS | AUTHENTICATION METHOD |
|---|---|
| UNLOCK | VEIN PATTERN |
| CHANGE LOCK CONDITIONS | FINGERPRINT PATTERN |
| WITHDRAW MONEY | PIN |

TBL1

FIG.5

| ID | ⋯ |
|---|---|
| ACCOUNT NUMBER | ⋯ |
| BALANCE | ⋯ |
| ACCOUNT STATE | ⋯ |
| TRANSACTION LIMITS | ⋯ |
| TEMPLATE DATA — PIN | ⋯ |
| TEMPLATE DATA — PASSWORD | ⋯ |
| TEMPLATE DATA — FINGERPRINT PATTERN | ⋯ |
| TEMPLATE DATA — VEIN PATTERN | ⋯ |
| CONTACT INFORMATION OF A USER — USER NAME | ⋯ |
| CONTACT INFORMATION OF A USER — E-MAIL ADDRESS | ⋯ |
| CONTACT INFORMATION OF A USER — PHONE NUMBER | ⋯ |
| CONTACT INFORMATION OF A USER — ADDRESS | ⋯ |

FIG.6

| MONEY AMOUNT RANK | USAGE MONEY AMOUNT | AUTHENTICATION METHOD |
|---|---|---|
| 3 | GREATER OR EQUAL TO YEN 10,000 | SEVENTH AUTHENTICATION METHOD |
| 2 | GREATER OR EQUAL TO YEN 1,000 BUT LESS THAN YEN 10,000 | FIFTH AUTHENTICATION METHOD |
| 1 | LESS THAN YEN 1,000 | FOURTH AUTHENTICATION METHOD |

TBL2

FIG.15

AUTHENTICATION SYSTEM, AUTHENTICATION APPARATUS, AUTHENTICATION METHOD AND AUTHENTICATION PROGRAM

CROSS REFERENCES TO RELATED APPLICATIONS

The present application claims priority to Japanese Patent Application JP2005-361116 filed in the Japanese Patent Office on Dec. 14, 2005, and Japanese Patent Application JP2005-206051 filed in the Japanese Patent Office on Jul. 14, 2005, the entire contents of which being incorporated herein by reference.

BACKGROUND

The present application relates to an authentication system, authentication apparatus, authentication method and authentication program, and particularly relates to a technique for improving security when authenticating a user who uses an Automatic Teller Machine (ATM) in a bank and the like, for example.

When a user operates an ATM, a financial institution such as a bank performs various operations associated with his/her saving account, such as withdrawal of money and transfer of money from his/her saving account to other accounts.

A saving account management system, which manages users' saving accounts in financial institutions, utilizes a host computer to manage information about users' saving accounts. In addition, a four-digit Personal Identification Number (PIN) for a saving account, which is previously set by a user, has been registered in the saving account management system as template data which is utilized for collation when the saving account management system authenticates users.

When a user operates the ATM, the saving account management system recognizes his/her account number based on his/her cash card previously issued to him/her. The saving account management system then asks him/her to enter his/her PIN to be used as challenge data for his/her authentication, and then checks the PIN of the challenge data against the PIN of the template data to authenticate him/her.

On the other hand, there is a saving account management system to which a user can set usage availability conditions. For example, the usage availability conditions limit the time you can withdraw your money. This reduces the risk that others could withdraw your money without you knowing (see Jpn. Pat. Laid-open Publication No. 2004-326509 [Page 9 and FIG. 1], for example).

However, when a user sets or changes the usage availability conditions, the saving account management system with the above configuration authenticates him/her using the same authentication method as it uses when users withdraw their money. That is to say, the saving account management system uses a combination of an account number recorded on a cash card and a PIN to authenticate a user.

In this case, others could set and change user's usage availability conditions as well as withdrawing his/her money, if they get his/her cash card and PIN. That is to say, in the saving account management system, others could change user's usage availability conditions to withdraw his/her money illegally, if his/her card is stolen or forged by them and his/her PIN becomes known to them. That is to say, in the saving account management system, there is a possibility that the usage availability conditions may not work well, and security may not be enough.

The present is in view of the above points and is intended to provide an authentication system, authentication apparatus, authentication method and authentication program capable of reducing the risk of unfair use by a third party.

SUMMARY

In an embodiment, an authentication system includes: a storage section that stores association information where a plurality of instructions for individual data is associated with authentication methods which are to be used to authenticate a user, the individual data being previously allocated to a legitimate user individually; a selection section that selects, based on the association information, the authentication method corresponding to the instruction input by a user; and an authentication section that follows the authentication method selected to authenticate the user as the legitimate user based on a result of checking challenge data obtained from the user for the check against template data previously registered as authentication information for the legitimate user.

In this manner, the authentication system uses a different authentication method for a different instruction to authenticate a user. This reduces the risk of improperly authenticating other users as a legitimate user.

In addition, in an embodiment, an authentication apparatus, authentication method and authentication program stores association information where a plurality of instructions for individual data is associated with authentication methods which are to be used to authenticate a user (the individual data is previously allocated to a legitimate user individually), and selects, based on the association information, the authentication method corresponding to the instruction input by a user, and follows the authentication method selected to authenticate the user as the legitimate user based on a result of checking challenge data obtained from the user for the check against template data previously registered as authentication information for the legitimate user, and then executes a process in accordance with the instruction when the user is authenticated as the legitimate user.

In this manner, the authentication apparatus, authentication method and authentication program uses a different authentication method for a different instruction to authenticate a user. This reduces the risk of authenticating other users as a legitimate user improperly. Therefore, this prevents the authentication apparatus, authentication method and authentication program to execute an improper instruction input by other users.

In this way, the authentication system according to an embodiment uses a different authentication method for a different instruction to authenticate a user. This reduces the risk of improperly authenticating other users as a legitimate user. Thus, the authentication system can reduce the risk of unfair use by a third party.

In addition, the authentication apparatus, authentication method and authentication program according to an embodiment uses a different authentication method for a different instruction to authenticate a user. This prevents the authentication apparatus, authentication method and authentication program to execute an improper instruction input by other users. Thus, the authentication apparatus, authentication method and authentication program can reduce the risk of unfair use by a third party.

The nature, principle and utility of the embodiments will become more apparent from the following detailed description when read in conjunction with the accompanying drawings in which like parts are designate by like reference numerals or characters.

Additional features and advantages are described herein, and will be apparent from, the following Detailed Description and the figures.

BRIEF DESCRIPTION OF THE FIGURES

In the accompanying drawings:

FIG. 5 is a schematic diagram showing an authentication method table;

FIG. 6 is a schematic diagram showing managing items in a saving account database;

FIG. 15 is a schematic diagram showing an authentication method table;

DETAILED DESCRIPTION

An embodiment will be described in detail with reference to the accompanying drawings.

Figure 1:
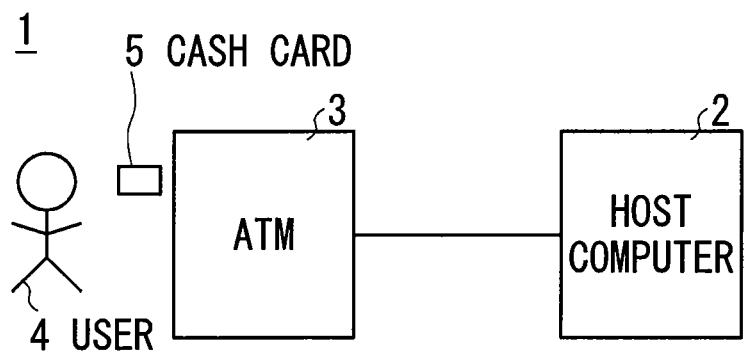
FIG. 1 is a schematic diagram showing the overall configuration of an ATM system according to a first embodiment.

(1) First Embodiment (1-1) Configuration of Saving Account Management System (1-1-1) Overall Configuration As shown in FIG. 1, an ATM system 1 (equivalent to an authentication system) includes a host computer 2, which manages data about a saving account in which a user 4 deposits his/her money; and an ATM 3, which is placed at bank premises and connected to the host computer 2 by online connection.

The ATM system 1 has already issued a cash card 5 to the user 4 who opened his/her saving account. When the user 4 tries to withdraw his/her money from the saving account, the ATM system 1 asks the user 4 to insert his/her cash card 5 into the ATM 3 and then enter his/her four-digit PIN. In response to that, the ATM system 1 authenticates the user 4 to provide the user 4 with his/her money.

In addition, to ensure the high accuracy of authentication to the user 4, the ATM system 1 utilizes a eight-digit alphanumeric password (Information input by a user through keys, such as PIN and passwords, will be also referred to as input information), or biological information, such as a pattern of a fingerprint on the end of a finger and a vein pattern on a palm (This will be described in detail below), as well as the four-digit PIN.

The ATM system 1 includes a plurality of ATMs 3 connected to one host computer 2. For ease of explanation, one of the ATMs 3 is shown in FIG. 1.

(1-1-2) Configuration of Host Computer

Figure 2:
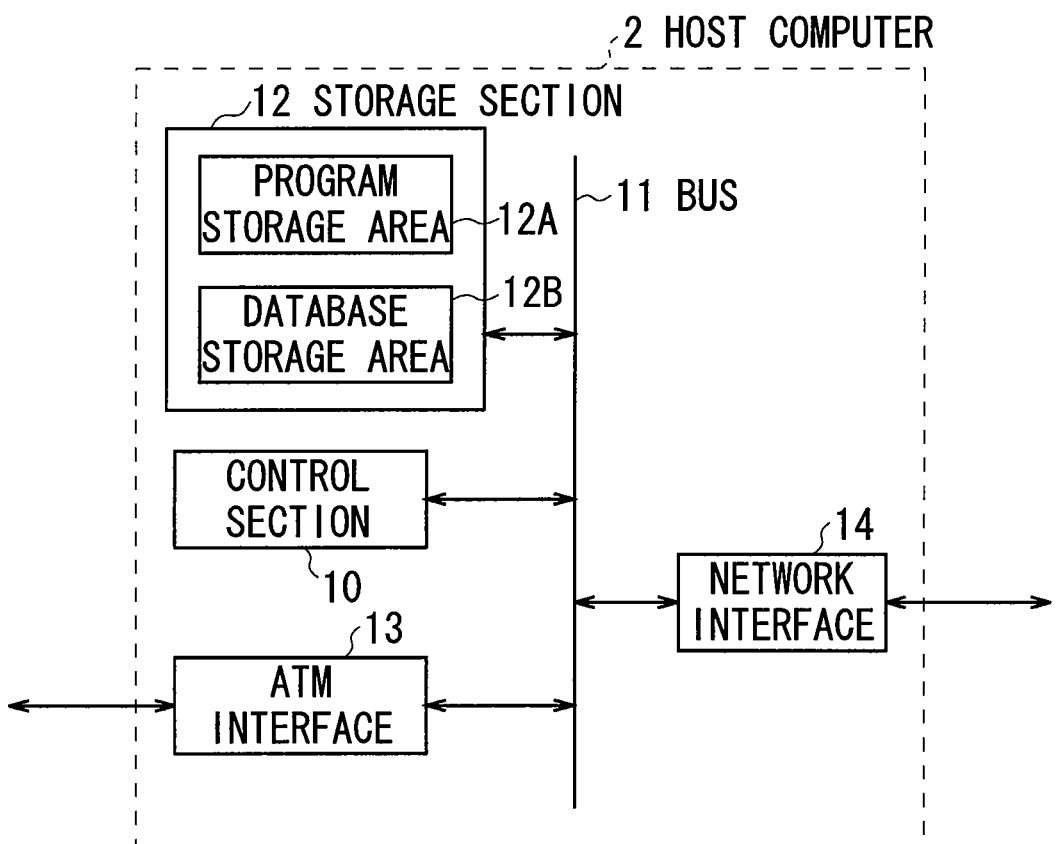
FIG. 2 is a block diagram showing the circuit configuration of a host computer.

As shown in FIG. 2, the host computer 2 includes a control section 10 that takes overall control of the host computer 2. The control section 10 has the same configuration as a Central Processing Unit (CPU). The control section 10 is connected through a bus 11 to a storage section 12, which is equivalent to a hard disk drive and stores various programs and information about users' saving accounts; an ATM interface 13, which communicates with the ATM 3; and a network interface 14, which communicates with devices such as a backup computer (not shown) that backs up databases.

The control section 10 includes a Read Only Memory (ROM) (not shown), and a Random Access Memory (RAM) (not shown). The control section 10 reads out various programs such as Operating System (OS) and a saving accounts management program from the ROM or a program storage area 12A of the storage section 12, and then loads these programs onto the RAM to run these programs. Therefore, the control section 10 provides various functions.

When the control section 10 receives a process request (which is for example a request for an user authentication process) from the ATM 3 (FIG. 1) connected through the ATM interface 13, the control section 10 reads out information to be used for the process request from the storage section 12, and then performs computation in accordance with the process request. The control section 10 then supplies a result of the computation to the ATM 3 through the ATM interface 13.

A database storage area 12B of the storage section 12 stores information about saving accounts: account numbers and the balances. In addition, the database storage area 12B stores a saving account database (described below). The saving account database includes individual data. The individual data include template data to be used for authenticating users. The individual data is similar to biological information such as PIN, passwords, the pattern of the finger print (which is previously obtained from the fingertip of the user 4), and the pattern of the vein (which is previously obtained from the palm of the user 4).

(1-1-3) Configuration of ATM

Figure 3:
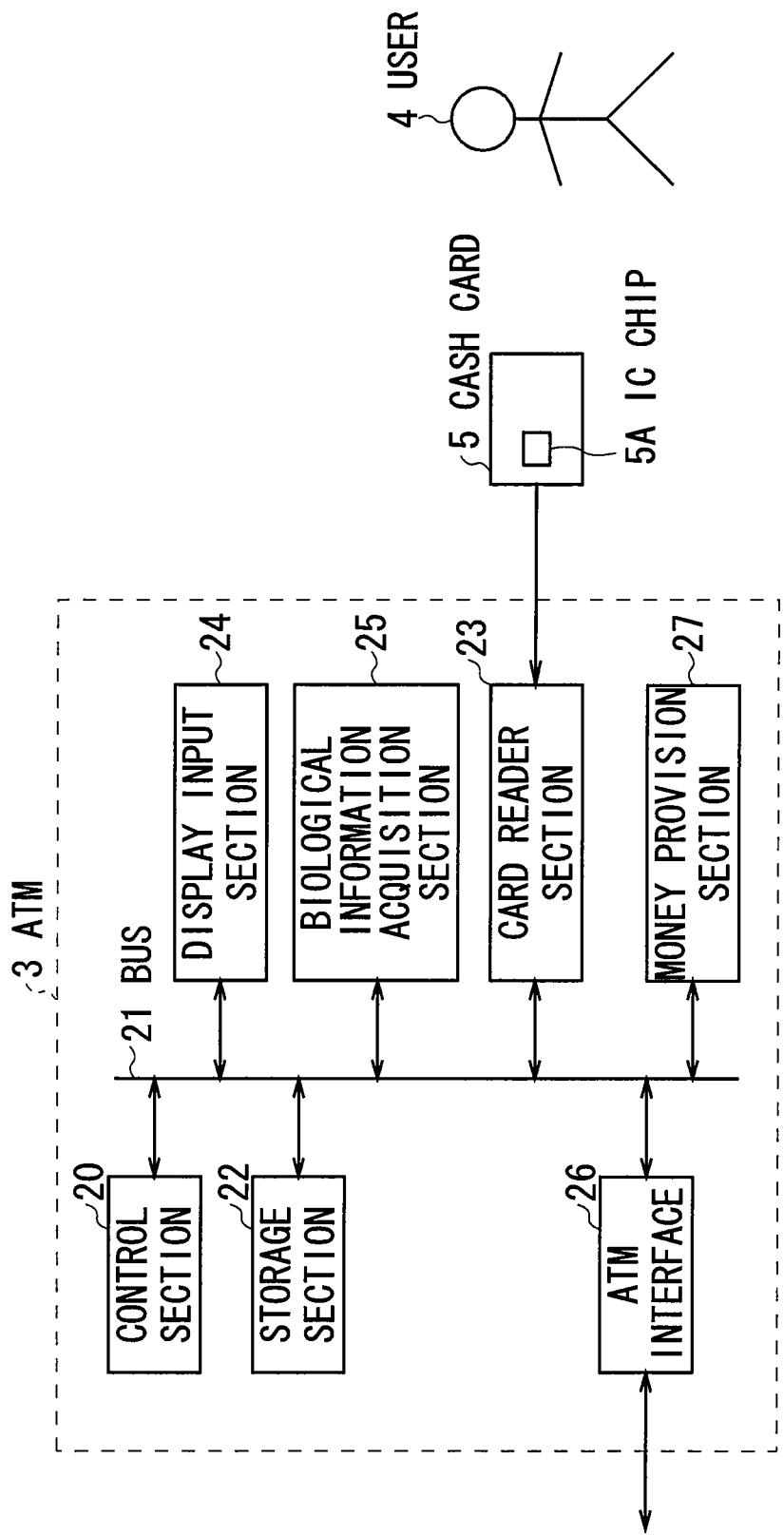
FIG. 3 is a block diagram showing the circuit configuration of an ATM.

As shown in FIG. 3, the ATM 3 includes a control section 20 whose configuration is the same as a CPU. The control section 20 takes overall control of the ATM 3. The control section 20 connects through a bus 21 to a storage section 22 (equivalent to a hard disk drive), which stores various programs; a card reader section 23, which reads out from an Integrated Circuit (IC) chip 5A of the cash card 5 information about a saving account; a display input section 24 (equivalent to a touch panel), which displays various information to the user 4 and accepts input operation of the user 4; a biological information acquisition section 25, which acquires biological information (biometrics) about the user 4; an ATM interface 26, which communicates with the host computer 2 (FIG. 1); and a money provision section 27, which provides money to the user 4.

In the same way as the control section 10 (FIG. 2) of the host computer 2, the control section 20 has a ROM and a RAM (not shown). The control section 20 reads out various programs such as a saving account management program from the ROM or the storage section 22, and then loads these programs onto the RAM to run these programs. In this manner, the control section 20 can provide various functions.

The biological information acquisition section 25 has a predetermined sensor, scanner, and the like. The biological information acquisition section 25 is able to acquire various kinds of biological information, such as the pattern of the fingerprint of the fingertip of the user 4 or the pattern of the vein of the palm of the user 4. The biological information are data (which will be also referred to as challenge data) of the user 4 to be checked against the template data when the user 4 is authenticated.

(1-2) Correspondence Between Level of Importance of Operation Instructions and Security Level of Authentication Method I-n the ATM system 1, the user 4 can usually withdraw his/her money from his/her account without limitation (this state will be referred to as a normal state) through the ATM 3. However, in the ATM system 1, each account can be set to a lock state which prohibits users from withdrawing their money for a while, in terms of security.

The fact is that the user 4 can previously set transaction limits (withdrawal limits) for his/her accounts in this ATM system 1. For example, the user 4 sets the transaction limit of Yen 80,000. In this case, for example, when the user tries to withdraw Yen 100,000 (which is more than the transaction limit) from his/her account, the ATM system 1 automatically sets this account to a lock state, and then maintains this lock state until the user performs unlock operation.

In addition, when someone (or the user 4) tries to withdraw money of more than the transaction limit and then the ATM system 1 sets this saving account to a lock state, the ATM system 1 notifies the legitimate user 4 that his/her saving account has been set to a lock state using notification means such as an electronic mail (e-mail).

Furthermore, when the ATM system 1 authenticates the user 4 who is operating the ATM 3, the ATM system 1 selects different authentication methods in dependence upon operation instructions such as operation of withdrawing money from the saving account and operation of unlocking.

Figure 4:
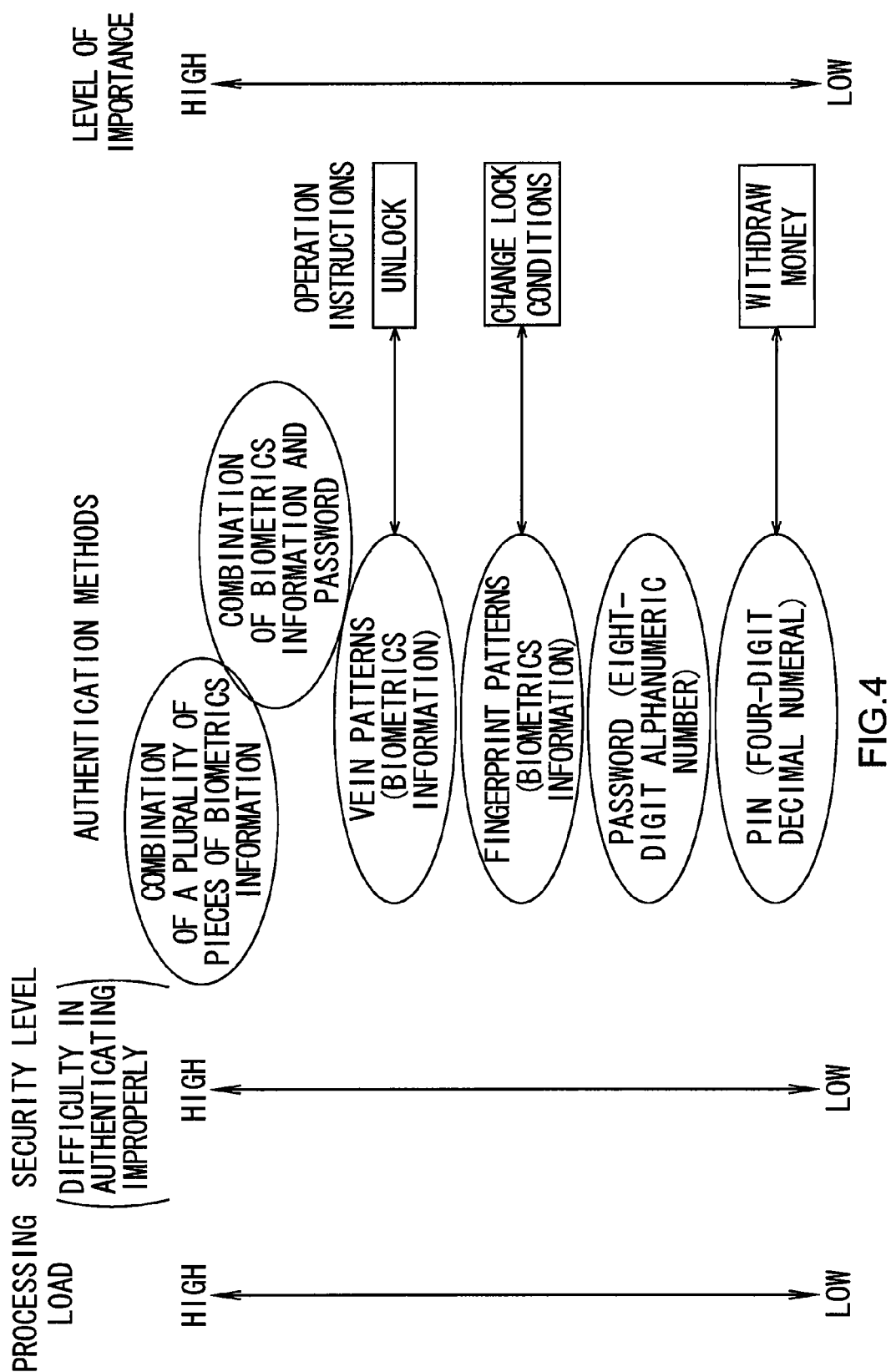
FIG. 4 is a schematic diagram showing the correspondence between authentication methods and operation instructions.

FIG. 4 shows the correspondence between the operation instructions and the authentication methods in the ATM system 1. In this case, "PIN" is a 4-digit number input by the user 4. "Password" is an 8-digit alphanumeric number input by the user 4. "Fingerprint pattern" is the pattern of fingerprint obtained from the surface of the fingertip of the user 4 (which is congenital). "Vein pattern" is the pattern of the veins which are inside the fingertip of the user 4 (which is congenital).

In this case, improper authentication means that third parties are authenticated as legitimate users. In terms of improper authentication, as shown in FIG. 4, security level (the difficulty of authenticating improperly) increases in the following order: "PIN", "Password", "Fingerprint pattern", "Vein pattern", "Combination of biometrics information and password", and "Combination of a plurality of pieces of biometrics information".

In terms of processing load (when the template data is checked against challenge data), the comparison between the authentication methods will be described below. As shown in FIG. 4, the processing load increases in the following order: "PIN", "Password", "Fingerprint pattern", "Vein pattern", "Combination of biometrics information and password", and "Combination of a plurality of pieces of biometrics information".

In the ATM system 1, it is desirable that a higher security-level authentication method be applied. However, applying the higher security-level authentication method (the higher difficulty of authenticating improperly) increases the complexity of the check process (which is performed when the user is authenticated), and this increases the processing load of the host computer 2 and ATM 3.

In an embodiment, the host computer 2 and ATM 3 of the ATM system 1 have upper limits on their processing ability. If the processing load for the check process (which is performed when the user is authenticated) increases, the user 4 has to wait for a longer time. In addition, this could cause an overflow or system down.

On the other hand, as shown in FIG. 4, with the operation instructions for the saving account (which are input by the user 4 through the ATM 3), the level of importance increases in the following order: operation of withdrawing money, operation of changing lock conditions, and operation of unlocking. That is to say, the saving account is increasingly affected in that order.

In this case, the level of importance for the operation of withdrawing money is relatively low because this operation is to withdraw money of less than the transaction limit (which was previously set). The level of importance for the operation of changing lock conditions is relatively high because this operation is to change the transaction limit. The level of importance for the operation of unlocking is the highest because this operation is to withdraw money without limitation.

In this case, in the ATM system 1, it is desirable that a higher security-level authentication method (which has higher difficulty of authenticating improperly) be applied to a higher importance-level operation instruction. In addition, it is desirable that a lower processing-load authentication method (which does not take a long time to complete the check process) be applied to a lower importance-level operation instruction.

Therefore, when the user 4 withdraws his/her money from his/her account, the ATM system 1 authenticates the user 4 using the 4-digit PIN. When the user 4 sets or changes the transaction limits on his/her account (this operation will be referred to as a lock condition change operation), the ATM system 1 authenticates the user 4 using the pattern of fingerprint. When the user 4 performs an unlock operation by which the lock state is unlocked (i.e. the saving account of the user 4 becomes a normal state), the ATM system 1 authenticates the user 4 using the pattern of veins which is obtained from the palm.

In an embodiment of the ATM system 1, as shown in FIG. 5, an authentication method table TBL1 (equivalent to association information) in which the operation instructions are associated with the authentication methods is stored in the storage section 12 of the host computer 2 and the storage section 22 of the ATM 3. In response to an operation instruction, the ATM system 1 selects an authentication method from the authentication method table TBL1.

This reduces the processing load for the check process on the ATM system 1 when the lower importance-level withdrawal operation is performed. By contrast, this increases the difficulty when the relatively higher importance-level unlock operation is performed.

The saving account database, which is stored in the database storage area 12B of the storage section 12 of the host computer 2, stores the following items for each saving account as shown in FIG. 6: "ID", "account number" and the "balance", which are used for managing the database; "account state" and "transaction limits", which indicate whether this account is the normal state or the lock state; "PIN", "password", "fingerprint pattern" and "vein pattern", which are used as template data when the check process is performed; and "user name", "e-mail address", "phone number" and "address", which are contact information of the user 4 (FIG. 1).

In an embodiment of the ATM system 1, the saving account is locked when operation that reduces the amount of money in the saving account by more than the transaction limit is performed (such as operation of bank transfer to other accounts as well as operation of withdrawal of money from the saving account). When the operation such as bank transfer is performed, the ATM system 1 performs process in the same way as it does when the operation of withdrawal of money is performed.

Figure 7:
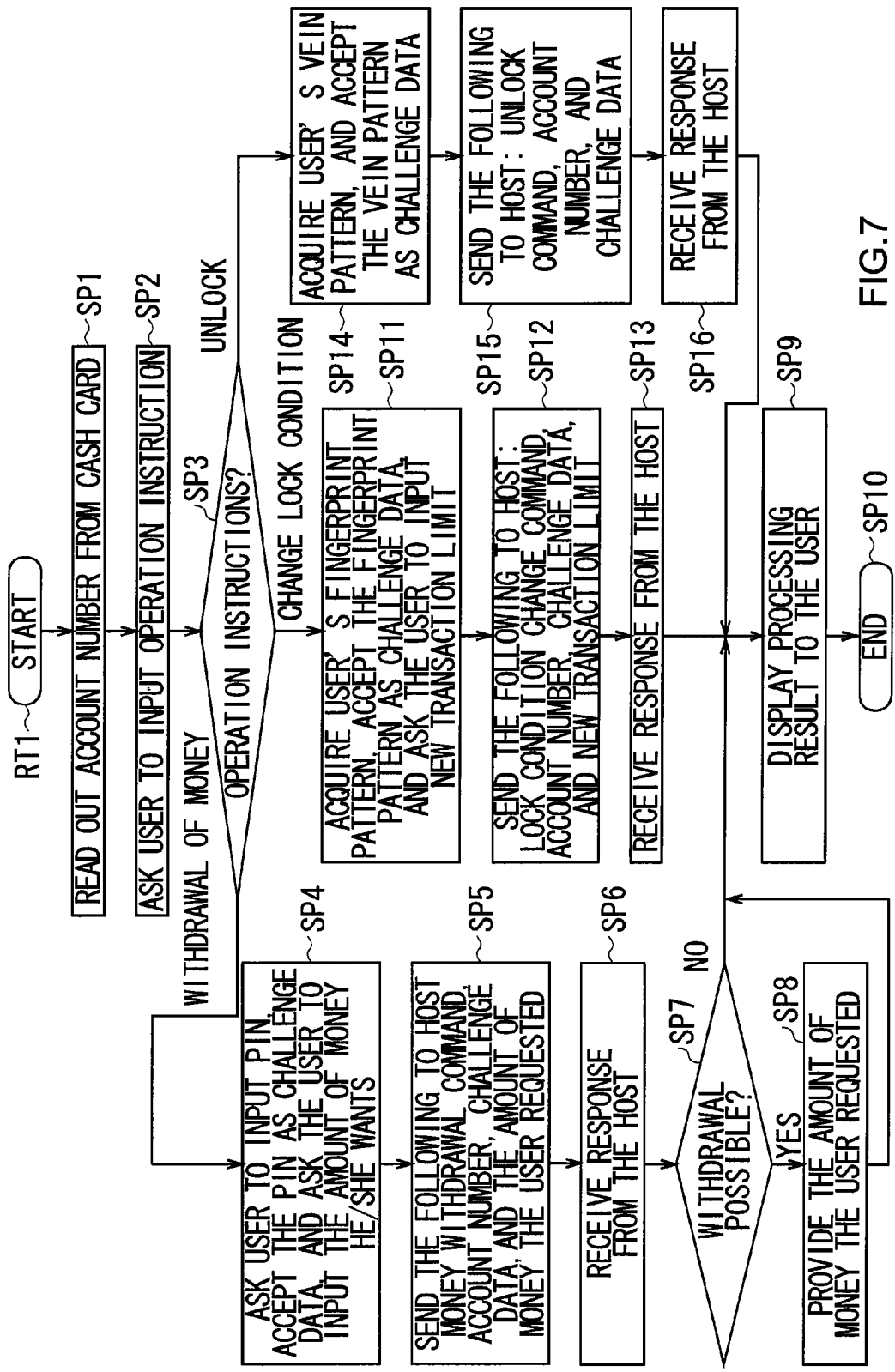
FIG. 7 is a flowchart illustrating an operation instruction acceptance process by the ATM.
Figure 8:
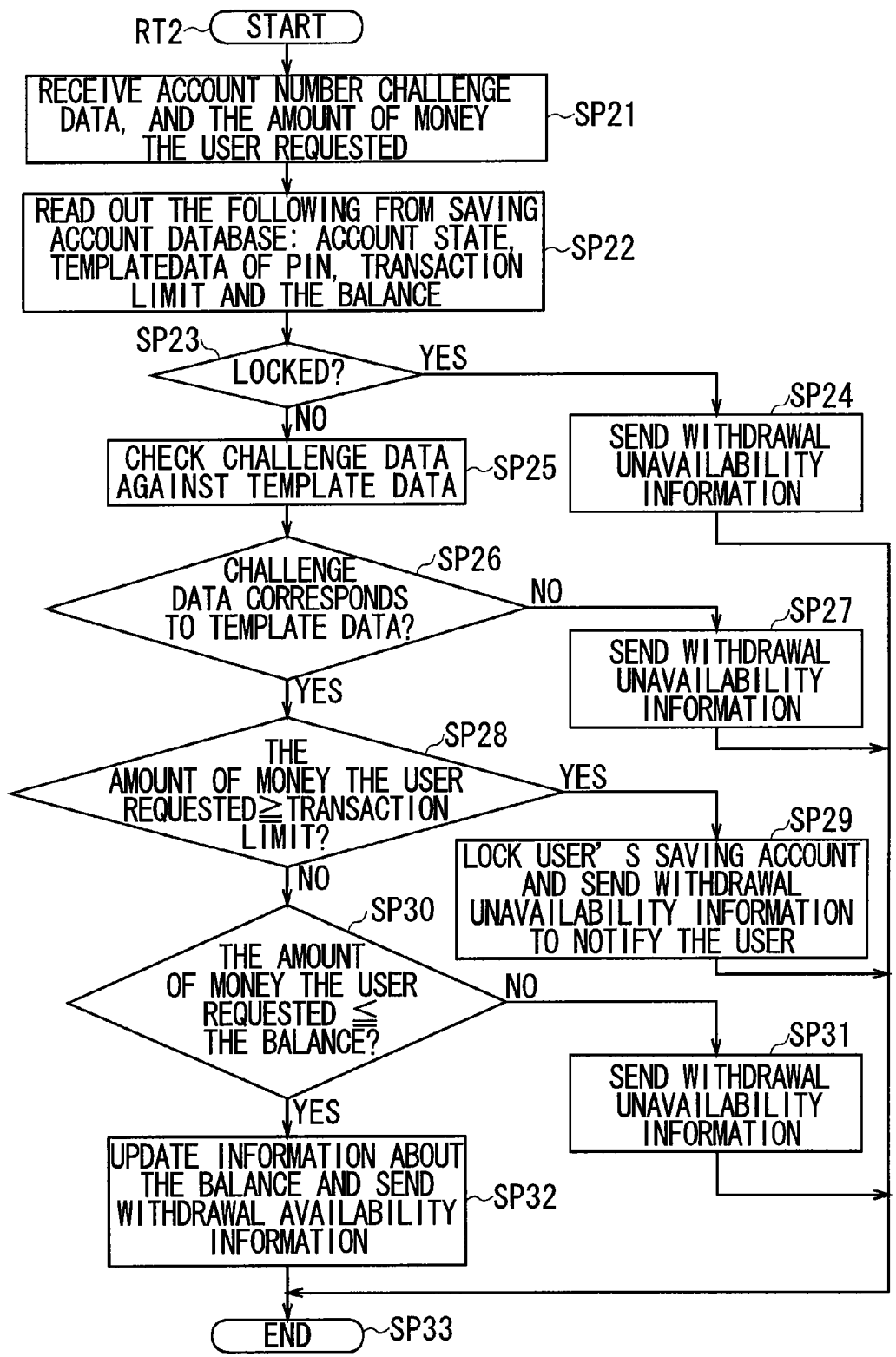
FIG. 8 is a flowchart illustrating a money withdrawal process by the host computer.

(1-3) Operation Instructions for Saving Account and Corresponding Process (1-3-1) Money Withdrawal Process In the ATM system 1, when the user withdraws his/her money from his/her saving account, the ATM 3 performs an operation instruction acceptance process while the host computer 2 performs a money withdrawal process. With reference to flowcharts shown in FIG. 7 and FIG. 8, the operation instruction acceptance process and the money withdrawal process will be described.

The control section 20 of the ATM 3 waits until the user 4 inputs an operation instruction. When the user 4 inserts his/her cash card 5 into the card reader section 23, the control section 20 starts a procedure RT1 (FIG. 7) of the operation instruction acceptance process and then proceeds to step SP1. At step SP1, the control section 20 of the ATM 3 reads out an account number from the cash card 5 through the card reader section 23, and then proceeds to next step SP2. A saving account corresponding to this account number will be referred to as a target saving account.

At step SP2, the control section 20 displays a menu screen on the display input section 24. The menu screen shows operation instruction items for this target saving account, such as "Money Withdrawal", "Change Lock Conditions", and "Unlock". The control section 20 asks the user 4 to choose one of these operation instruction items, and then proceeds to next step SP3.

At step SP3, the control section 20 determines whether the operation instruction item selected by the user 4 at step SP2 (this selected operation instruction item will be referred to as a selected item) is the "Money Withdrawal", the "Change Lock Conditions", or the "Unlock". When the "Money Withdrawal" is selected, the control section 20 proceeds to next step SP4 to perform the money withdrawal process.

At step SP4, the control section 20 follows the authentication method table TBL1 (FIG. 5), and asks the user 4 to input his/her four-digit numeric PIN through the display input section 24. The control section 20 accepts this PIN as challenge data to be checked with template data in the following check process. The control section 20 also asks the user 4 to input the amount of money he/she wants to withdraw through the display input section 24. The control section 20 subsequently proceeds to next step SP5.

At step SP5, the control section 20 sends to the host computer 2 a money withdrawal command, which forces the host computer 2 to start the money withdrawal process; the account number; the challenge data including the four-digit numeric PIN; and the amount of money the user 4 wants to withdraw. The control section 20 subsequently proceeds to next step SP6.

In response to the money withdrawal command from the ATM 3, the control section 10 of the host computer 2 starts a procedure RT2 (FIG. 8) of the money withdrawal process, and then proceeds to step SP21. At step SP21, the control section 10 receives from the ATM 3 the account number; the challenge data including the four-digit numeric PIN; and the amount of money the user 4 wants to withdraw. The control section 10 subsequently proceeds to next step SP22.

At step SP22, based on the account number, the control section 10 reads out the following items from the saving account database stored in the database storage area 12B (FIG. 2) of the storage section 12: an account state of the target saving account (the normal state or the lock state); the template data of the PIN; the transaction limits; and the balance. The control section 10 subsequently proceeds to next step SP23.

At step SP23, the control section 10 determines whether the saving account is in the lock state or not based on the account state. Affirmative result at step SP23 means that the saving account is not unlocked after this saving account was locked when someone (or the user 4) tried to withdraw money of more than the transaction limit from the saving account. In this case, the control section 10 proceeds to next step SP24.

At step SP24, the control section 10 associates withdrawal unavailability information indicating that the withdrawal of money is prohibited with information indicating that the target saving account is in the lock state. The control section 10 then sends the withdrawal unavailability information to the ATM 3, and proceeds to next step SP33 to end the procedure RT2 of the money withdrawal process.

On the other hand, negative result at step SP23 means that the withdrawal of money is allowed because the saving account is in the normal state. In this case, the control section 10 proceeds to next step SP25.

At step SP25, the control section 10 performs a predetermined check process. In this check process, the control section 10 checks the challenge data of the PIN received from the ATM 3 against the template data of the PIN read from the saving account database. The control section 10 subsequently determines whether or not the challenge data corresponds to the template data, and then proceeds to next step SP26.

At step SP26, the control section 10 determines whether or not the challenge data corresponds to the template data at step SP25. Negative result at step SP26 means that the control section 10 does not authenticate the user 4 as a legitimate user because the PIN shown in the challenge data does not correspond to the PIN shown in the template data. In this case, the control section 10 proceeds to next step SP27.

At step SP27, the control section 10 sends the ATM 3 withdrawal unavailability information that is associated with information indicating that the PIN shown in the challenge data does not correspond to the PIN shown in the template data. The control section 10 subsequently proceeds to next step SP33 to end the procedure RT2 of the money withdrawal process.

On the other hand, affirmative result at step SP26 means that the withdrawal of money is allowed because the target saving account is in the normal state and the PIN shown in the challenge data corresponds to the PIN shown in the template data. In this case, the control section 10 proceeds to next step SP28.

At step SP28, the control section 10 determines whether or not the amount of money the user 4 wants to withdraw (notified by the ATM 3) is greater or equal to the transaction limit. Affirmative result at step SP28 means that there is a high possibility that the user 4 who is currently operating the ATM 3 is not a legitimate user for this target saving account, which is to say the user 4 may illegally acquire the cash card 5 and its PIN and then input the amount of money he/she wants to withdraw, which is greater or equal to the transaction limit, without knowing the transaction limit. In this case, the control section 10 proceeds to next step SP29.

At step SP29, the control section 10 sets the lock state on the saving account by changing the "normal state" shown in the item of "account state" in the saving account database to the "lock state." At the same time, the control section 10 sends the ATM 3 withdrawal unavailability information that is associated with information indicating that the target saving account is in the lock state. In addition, by using an e-mail address shown in the item of "e-mail address" in the saving account database, the control section 10 sends an e-mail indicating that the target saving account has been set to the lock state. After that, the control section 10 proceeds to next step SP33 to end the procedure RT2 of the money withdrawal process.

On the other hand, negative result at step SP28 means that the user 4 who is currently operating the ATM 3 is a legitimate user for this target saving account. That is to say, there is a high possibility that the user 4 inputted the amount of money he/she wants to withdraw which is less than the transaction limit because he/she knew the transaction limit. In this case, the control section 10 proceeds to next step SP30 without changing the state (the normal state) of this target saving account.

At step SP30, the control section 10 determines whether or not the amount of money the user 4 wants to withdraw is less or equal to the balance. Negative result at step SP30 means that the amount of money left in the saving account is not enough to provide the user 4 with the amount of money he/she wants. In this case, the control section 10 sends the ATM 3 withdrawal unavailability information that is associated with information indicating that the amount of money left in the saving account is not enough. The control section 10 then proceeds to next step SP33 to end the procedure RT2 of the money withdrawal process.

On the other hand, affirmative result at step SP30 means that the user 4 can withdraw the amount of money he/she wants. In this case, the control section 10 proceeds to next step SP32.

At step SP32, the control section 10 updates the item of the "balance" in the saving account database by subtracting the amount of money the user 4 wants to withdraw from the latest balance shown in the item of the "balance." The control section 10 subsequently sends the ATM 3 withdrawal availability information indicating that the withdrawal of money is allowed, and then proceeds to next step SP33 to end the procedure RT2 of the money withdrawal process.

The control section 20 of the ATM 3 at step SP6 (FIG. 7) receives from the host computer 2 the withdrawal unavailability information or the withdrawal availability information, and then proceeds to next step SP7.

At step SP7, the control section 20 determines whether or not the control section 20 has received the withdrawal availability information at step SP6. Affirmative result at step SP7 means that the saving account is not in the lock state. This also means that the user 4 has been authenticated as a legitimate user by his/her PIN. In addition, this means that the control section 20 should provide the user 4 with the amount of money he/she requested, because the amount of money he/she requested is less than the transaction limit and is less or equal to the balance. In this case, the control section 20 proceeds to next step SP8.

At step SP8, through the money provision section 27 (FIG. 3), the control section 20 provides the user 4 with the amount of money he/she requested. The control section 20 subsequently proceeds to next step SP9.

On the other hand, negative result at step SP7 means that the control section 20 should not provide the user 4 with money because the control section 20 has received the withdrawal unavailability information from the host computer 2. In this case, the control section 20 proceeds to next step SP9.

At step SP9, in a case in which the control section 20 has received the withdrawal unavailability information from the host computer 2, the control section 20 displays information on the display input section 24 to let the user 4 know the fact that his/her saving account is locked or the fact that the amount of money left in his/her saving account is not enough (these facts are shown in the withdrawal unavailability information). By contrast, in a case in which the control section 20 has received the withdrawal availability information and provided the user 4 with money, the control section 20 displays the balance after the withdrawal on the display input section 24, and then ejects the cash card 5 from the card reader section 23 to return the cash card 5 to the user 4. After that, the control section 20 proceeds to next step SP10 to end the procedure RT1 or the operation instruction acceptance process.

(1-3-2) Lock Condition Change Process

Figure 9:
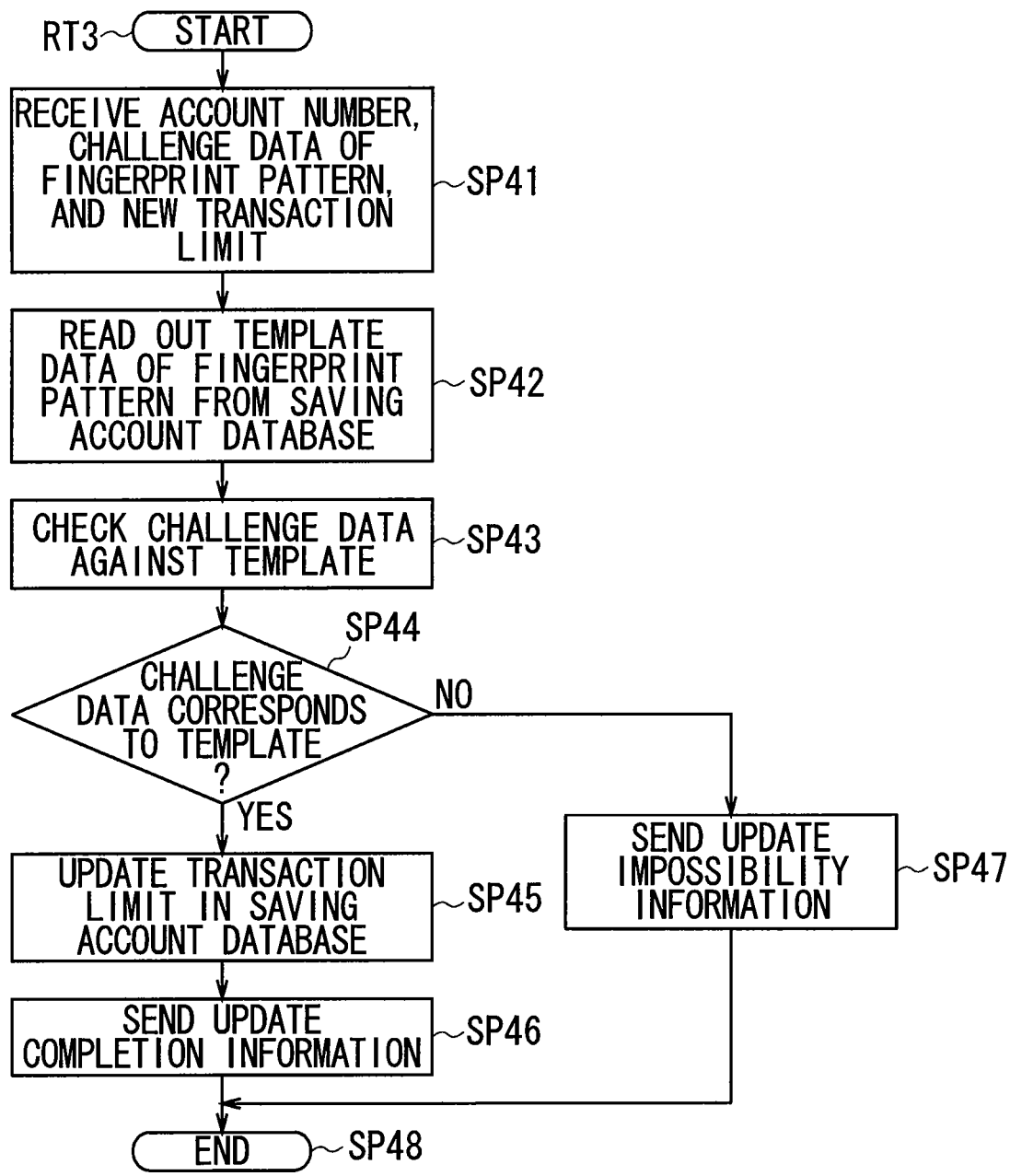
FIG. 9 is a flowchart illustrating a lock condition change process by the host computer.

When the user 4 tries to change his/her saving account's lock condition, the ATM 3 and the host computer 2 perform the operation instruction acceptance process and a lock condition change process respectively. With reference to flowcharts shown in FIG. 7 and FIG. 9, the operation instruction acceptance process and the lock condition change process will be described below.

In the same way as the above money withdrawal process, the control section 20 of the ATM 3 starts the procedure RT1 of the operation instruction acceptance process (FIG. 7) when the user 4 inserts his/her cash card 5 into the card reader section 23. The control section 20 subsequently performs the process of step SP1 and SP2, and then proceeds to step SP3.

At step SP3, when the item of "Change Lock Conditions" is selected, the control section 20 proceeds to next step SP11 to perform the lock condition change process.

At step SP11, the control section 20 follows the authentication method table TBL1 (FIG. 5), and displays on the display input section 24 an instruction such as "Put Your Finger on Fingerprint Reader" to let the user 4 put his/her finger on a fingerprint reader of the biological information acquisition section 25. In this manner, the control section 20 acquires the fingerprint pattern of the user 4. The control section 20 then encodes this fingerprint pattern in a predetermined manner to produce data to be used as challenge data (the challenge data will be checked against the template data in the check process). The control section 20 also asks the user 4 to input a new transaction limit through the display input section 24, and then proceeds to next step SP12.

At step SP12, the control section 20 sends the following information to the host computer 2: a lock condition change command, which directs the host computer 2 to start the lock condition change process, the account number, the challenge data indicative of the fingerprint pattern, the new transaction limit. The control section 20 subsequently proceeds to next step SP13.

In response to the lock condition change command from the ATM 3, the control section 10 of the host computer 2 starts a procedure RT3 of the lock condition change process (FIG.

9) and then proceeds to step SP41. At step SP41, the control section 10 receives the following information from the ATM 3: the account number, the challenge data indicative of the fingerprint pattern, and the new transaction limit. The control section 10 then proceeds to next step SP42.

At step SP42, based on the account number, the control section 10 reads out the template data of the fingerprint pattern associated with the target saving account from the saving account database stored in the database storage area 12B (FIG. 2) of the storage section 12. The control section 10 subsequently proceeds to next step SP43.

At step SP43, the control section 10 performs a predetermined check process. In this check process, the control section 10 checks the challenge data of the fingerprint pattern received from the ATM 3 against the template data of the fingerprint pattern read from the saving account database. In this manner, the control section 10 checks whether the challenge data substantially corresponds to the template data (which is to say, the control section 10 checks whether the difference between the challenge data and the template data is within a predetermined allowable tolerance). The control section 10 subsequently proceeds to next step SP44.

At step SP44, the control section 10 determines whether the challenge data substantially corresponds to the template data at step SP43. Affirmative result at step SP44 means that the difference between the two fingerprint patterns is within the predetermined allowable tolerance. This therefore means that the user 4 was successfully authenticated as a legitimate user. In this case, the control section 10 proceeds to next step SP45.

At step SP45, the control section 10 updates information shown in the item of "Transaction Limits" in the saving account database such that this item will show the new transaction limit, and then proceeds to next step SP46.

At step SP46, the control section 10 sends the ATM 3 update completion information indicating that the update of the transaction limit has been completed. The control section 10 subsequently proceeds to next step SP48 to end the procedure RT3 of the lock condition change process.

On the other hand, a negative result at step SP44 means that the difference between the two fingerprint patterns is outside the predetermined allowable tolerance. This means that the authentication ended in failure and the user 4 was not authenticated as a legitimate user for this target saving account. This means that the control section 10 should not update the item of "Transaction Limits" in the saving account database. In this case, the control section 10 proceeds to next step SP47.

At step SP47, without updating the item of "Transaction Limits" in the saving account database, the control section 10 sends the ATM 3 update impossibility information indicating that the transaction limit has not been updated due to the failure of the authentication. The control section 10 subsequently proceeds to next step SP48 to end the procedure RT3 of the lock condition change process.

In response to that, the control section 20 of the ATM 3 at step SP13 (FIG. 7) receives from the host computer 2 the update completion information or the update impossibility information, and then proceeds to next step SP9.

At step SP9, in a case in which the control section 20 received the update completion information from the host computer 2, the control section 20 displays on the display input section 24 the fact that the transaction limit has been successfully updated. In a case in which the control section 20 received the update impossibility information, the control section 20 at step SP9 displays on the display input section 24 the fact that the transaction limit has not been updated due to the failure of the authentication. The control section 20 subsequently ejects the cash card 5 from the card reader section 23 to return the cash card 5 to the user 4, and then proceeds to next step SP10 to end the procedure RT1 of the operation instruction acceptance process.

(1-3-3) Unlock Process

Figure 10:
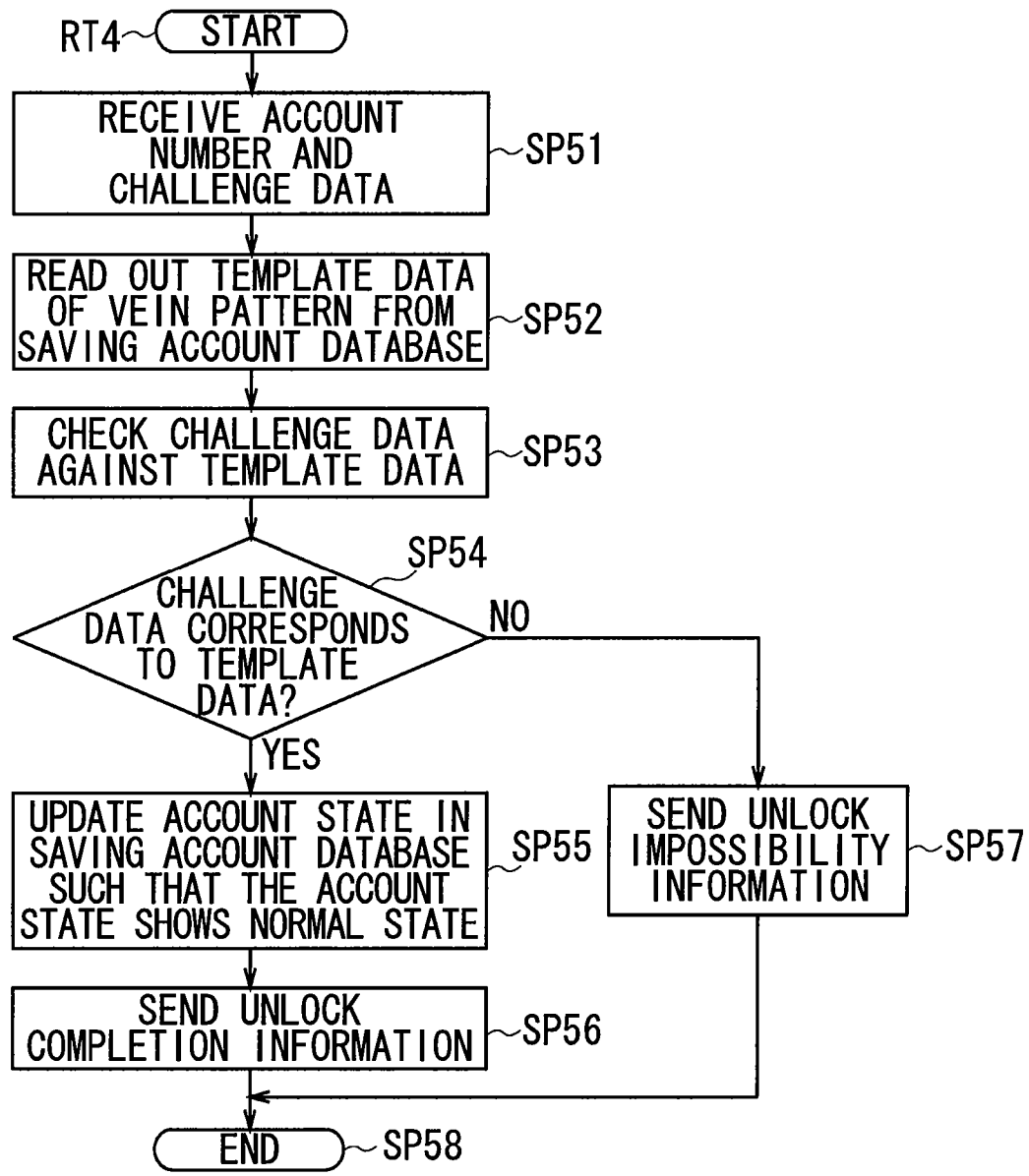
FIG. 10 is a flowchart illustrating an unlock process by the host computer.

When the user 4 tries to unlock his/her locked saving account, the ATM 3 and the host computer 2 performs the operation instruction acceptance process and an unlock process respectively. With reference to flowcharts shown in FIG. 7 and FIG. 10, the operation instruction acceptance process and the unlock process will be described.

In the same way as the above money withdrawal process, the control section 20 of the ATM 3 starts the procedure RT1 of the operation instruction acceptance process (FIG. 7) when the user 4 inserts his/her cash card 5 into the card reader section 23. The control section 20 subsequently performs the process of step SP1 and SP2, and then proceeds to step SP3.

At step SP3, when the item of "Unlock" is selected, the control section 20 proceeds to next step SP14 to perform the unlock process.

At step SP14, the control section 20 follows the authentication method table TBL1 (FIG. 5), and displays on the display input section 24 an instruction such as "Put Your Palm on Vein Reader" to let the user 4 put his/her palm on a vein reader of the biological information acquisition section 25. In this manner, the control section 20 acquires the vein pattern of the user 4. The control section 20 then encodes this vein pattern in a predetermined manner to produce data to be used as challenge data (the challenge data will be checked against the template data in the check process). The control section 20 subsequently proceeds to next step SP15.

At step SP15, the control section 20 sends the following information to the host computer 2: an unlock command, which directs the host computer 2 to start the unlock process, the account number, and the challenge data indicative of the vein pattern. The control section 20 subsequently proceeds to next step SP16.

In response to the unlock command from the ATM 3, the control section 10 of the host computer 2 starts a procedure RT4 of the unlock process (FIG. 10) and then proceeds to step SP51. At step SP51, the control section 10 receives the following information from the ATM 3: the account number, and the challenge data indicative of the vein pattern. The control section 10 then proceeds to next step SP52.

At step SP52, based on the account number, the control section 10 reads out the template data of the vein pattern associated with the target saving account from the saving account database stored in the database storage area 12B (FIG. 2) of the storage section 12. The control section 10 subsequently proceeds to next step SP53.

At step SP53, the control section 10 performs a predetermined check process. In this check process, the control section 10 checks the challenge data of the vein pattern received from the ATM 3 against the template data of the vein pattern read from the saving account database. In this manner, the control section 10 checks whether the challenge data substantially corresponds to the template data (which is to say, the control section 10 checks whether the difference between the challenge data and the template data is within a predetermined allowable tolerance). The control section 10 subsequently proceeds to next step SP54.

At step SP54, the control section 10 determines whether the challenge data substantially corresponds to the template data at step SP53. Affirmative result at step SP54 means that the difference between the two vein patterns is within the predetermined allowable tolerance. This means that the user 4 was successfully authenticated as a legitimate user. In this case, the control section 10 proceeds to next step SP55.

At step SP55, the control section 10 updates information shown in the item of "Account State" in the saving account database such that this item will show the "normal state" instead of the "lock state", and then proceeds to next step SP56.

At step SP56, the control section 10 sends the ATM 3 unlock completion information indicating that the saving account has been successfully unlocked. The control section 10 subsequently proceeds to next step SP58 to end the procedure RT4 of the unlock process.

On the other hand, negative result at step SP54 means that the difference between the two vein patterns is outside the predetermined allowable tolerance. This therefore means that the authentication ended in failure, which is to say the user 4 was not authenticated as a legitimate user for this target saving account. That is to say, this means that the item of "Account State" in the saving account database should be kept in the lock state, which is to say the control section 10 should not update the item of "Account State" in the saving account database. In this case, the control section 10 proceeds to next step SP57.

At step SP57, without updating the item of "Account State" in the saving account database, the control section 10 sends the ATM 3 unlock impossibility information indicating that the saving account has not been unlocked due to the failure of the authentication. The control section 10 subsequently proceeds to next step SP58 to end the procedure RT4 of the unlock process.

In response to that, the control section 20 of the ATM 3 at step SP16 (FIG. 7) receives from the host computer 2 the unlock completion information or the unlock impossibility information, and then proceeds to next step SP9.

At step SP9, in a case in which the control section 20 received the unlock completion information from the host computer 2, the control section 20 displays on the display input section 24 the fact that the saving account has been successfully unlocked. In a case in which the control section 20 received the unlock impossibility information, the control section 20 at step SP9 displays on the display input section 24 the fact that the saving account has not been unlocked due to the failure of the authentication. The control section 20 subsequently ejects the cash card 5 from the card reader section 23 to return the cash card 5 to the user 4, and then proceeds to next step SP10 to end the procedure RT1 of the operation instruction acceptance process.

(1-4) Operation and Effects

In the ATM system 1 with the above configuration, when the user 4 inputs an operation instruction through the ATM 3, the host computer 2 performs an authentication process based on the authentication method table TBL1 (FIG. 5). For example, when the user 4 operates the ATM 3 to withdraw his/her money, the host computer 2 performs the authentication process using his/her PIN. When the user 4 operates the ATM 3 to change his/her lock condition, the host computer 2 performs the authentication process using his/her fingerprint pattern. When the user 4 operates the ATM 3 to unlock his/her saving account, the host computer 2 performs the authentication process using his/her vein pattern.

Therefore, as the saving account of the user 4 is more affected by the operation instruction input by the user 4 (i.e. the level of importance increases), the ATM system 1 increases the security level of the authentication method (in response to each operation instruction) and also increases the processing load during the check process. When the lower importance-level operation instruction (such as an operation of withdrawing money) is input, the ATM system 1 reduces the processing load during the check process. When the higher importance-level operation instruction (such as an operation of unlocking the saving account) is input, the ATM system 1 increases the security level and also increases the difficulty of authenticating third parties improperly as legitimate users.

This reduces the risk that a third party will perform the higher importance-level operation instruction such as an operation of unlocking the saving account. And this prevents serious damages to the user 4. For example this prevents the third party to withdraw a large amount of money from the saving account of the user 4 illegally.

In addition, the ATM system 1 automatically locks the saving account when the amount of money the user 4 (or someone) requested to withdraw exceeds the transaction limit during the money withdrawal process. Therefore, even if a third party steals or forges the cash card and also acquires its PIN, the ATM system 1 prevents illegal withdrawal by automatically locking the saving account when the third party tries to withdraw cash of more than the transaction limit. Thus, the amount of damage will be less than the transaction limit.

In this case, the ATM system 1 performs the authentication process using biological information when it changes the lock condition or unlocks the saving account. Therefore, even if a third party steals the cash card and also acquires its PIN, the ATM system 1 prevents the third party to change the lock condition or unlock the saving account. This prevents the third party to withdraw a large amount of money from the saving account illegally.

For example, even if the legitimate user 4 for the saving account does not notice that his/her cash card 5 has been stolen or forged, the ATM system 1 can lock his/her saving account when someone tries to withdraw money of more than the transaction limit from his/her saving account.

In addition, the host computer 2 of the ATM system 1 sends the user 4 an e-mail using his/her e-mail address to notify the user 4 of the fact that his/her saving account has been locked. In this manner, the ATM system 1 lets the user 4 know about the possibility that his/her cash card 5 might be stolen or forged and his/her PIN might become known to others.

Furthermore, the user can set the transaction limit himself/herself. Setting the transaction limit low prevents illegal withdrawal by a third party, because there is a high possibility that the ATM system 1 automatically lock the saving account when a third party tries to withdraw money illegally. In this manner, this prevents illegal withdrawal.

In this case, only the legitimate user 4 can change the transaction limit because he/she can be authenticated as a legitimate user based on his/her fingerprint pattern through the ATM 3. When the legitimate user 4 wants to withdraw cash more than the transaction limit, the user 4 can temporarily change the transaction limit to withdraw a large amount of money. After that the user 4 can get the setting of the transaction limit back to allow only a small amount of money to be withdrawn. This increases both the usability and the security.

In this way, when the user 4 inputs an operation instruction through the ATM 3, the ATM system 1 with the above configuration performs an authentication process using one of the authentication methods selected according to the level of importance of the operation instruction. That is to say, the authentication method to be used in the authentication process is selected according to the degree of operation instruction's effect on the saving account. When the lower importance-level operation instruction (such as an operation of withdrawing money) is input, the ATM system 1 reduces the processing load during the check process. When the higher importance-level operation instruction (such as an operation of unlocking the saving account) is input, the ATM system 1 increases the security level and also increases the difficulty of authenticating third parties improperly as legitimate users.

(2) Second Embodiment (2-1) Configuration of Electronic Money System

Figure 11:
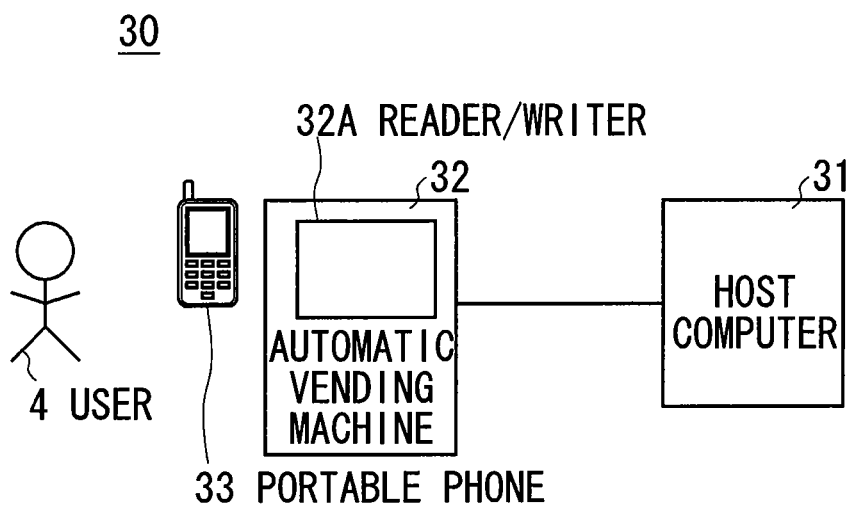
FIG. 11 is a schematic diagram showing the overall configuration of an electronic money system according to a second embodiment.

In FIG. 11 (the parts of FIG. 11 have been designated by the same reference numerals and marks as the corresponding parts of FIG. 1), an electronic money system 30 includes a host computer 31, which takes overall control of the electronic money system 30; and an automatic vending machine 32, which supports electronic money service.

The automatic vending machine 32 includes a reader/writer 32A to support electronic money service. Therefore, to provide predetermined commercial products, the automatic vending machine 32 can perform a settlement process about electronic money with an electronic money device such as a portable phone 32 and an IC card (not shown) which have an electronic money capability.

The portable phone 33 has an electronic money capability as well as phone and wireless communication capabilities. The portable phone 33 manages money deposited by the user 4, an owner of the portable phone 33, as electrical money.

(2-1-2) Configuration of Reader/Writer

The reader/writer 32A of the automatic vending machine 32 has a control section 40 whose configuration is as the same as a CPU. The control section 40 takes overall control of the reader/writer 32A. The control section 40 connects through a bus 41 to a storage section 42 (equivalent to a nonvolatile memory); a network interface 43, which performs various communication with the automatic vending machine 32; a user interface 44, which for example accepts user's operation for buttons; and a communication interface 45, which performs a wireless communication process with the electronic money device (such as the portable phone 33 and an IC card (not shown)) for electronic settlement.

The control section 40 includes a ROM and a RAM (not shown). The control section 40 reads out various programs such as an OS and a settlement processing program from the ROM, and then loads these programs onto the RAM to run these programs. In this manner, the control section 40 provides various functions.

Actually, when the control section 40 receives a process request (which for example directs the control section 40 to perform the settlement process) from the automatic vending machine 32 (FIG. 11) through the network interface 43, the control section 40 reads out information from the storage section 42 to perform the process requested. The control section 40 performs computation in accordance with the process request, and then sends a result of the computation to the automatic vending machine 32 through the network interface 43.

The user interface 44 includes a certain sensor and a scanner as well as operation keys and a display section. The user interface 44 acquires input data, such as PIN and passwords, and various kinds of biological information, such as the fingerprint pattern obtained from the fingertip of the user 4 and the vein pattern obtained from the palm of the user 4. Based on the data, the user interface 44 generates template data to be used in the authentication process.

(2-1-3) Configuration of Portable Phone

The portable phone 33 has a control section 50 whose configuration is the same as a CPU. The control section 50 takes overall control of the portable phone 33. The control section 50 connects through a bus 51 to a storage section 52 (equivalent to a nonvolatile memory); a user interface 53, which accepts user's operation for buttons and also displays a result of processes; a wireless communication processing section 54, which wirelessly communicates with a base station (for portable phones) through an antenna 54A; a communication interface 45, which performs a wireless communication process with the reader/writer 32A of the automatic vending machine 32, a reader/writer in a store (not shown) and the like for electronic settlement.

The control section 50 includes a ROM and a RAM (not shown). The control section 50 reads out various programs such as an OS, a communication processing program and a settlement processing program from the ROM, and then loads these programs onto the RAM to run these programs. In this manner, the control section 50 provides various functions.

The storage section 52 stores balance data (equivalent to individual data) showing the amount of electronic money left (i.e. the balance); template data for checking, which the legitimate user 4 previously registered. The template data will be described in detail later. In addition, the storage section 52 stores an authentication method table TBL, which will be described in detail later.

The user interface 53 has a display section 53A equivalent to a liquid crystal display; operation keys 53B including numeric keys (from 0 to 9), a cursor key, a set key and a cancel key; a speaker 53C; a microphone 53D; and a biometrics data acquisition section 53E, which acquires biometrics data such as the vein and fingerprint pattern of the fingertip of the user 4.

In fact, to purchase a commercial product from the automatic vending machine 32, the user 4 places his/her portable phone 33 near the reader/writer 32A. At this time, the control section 50 wirelessly communicates with the reader/writer 32A through the communication interface 55 for electronic settlement. The control section 50 performs an electronic settlement process after authenticating the user 4 in a predetermined manner (which will be described in detail later).

Figure 13:
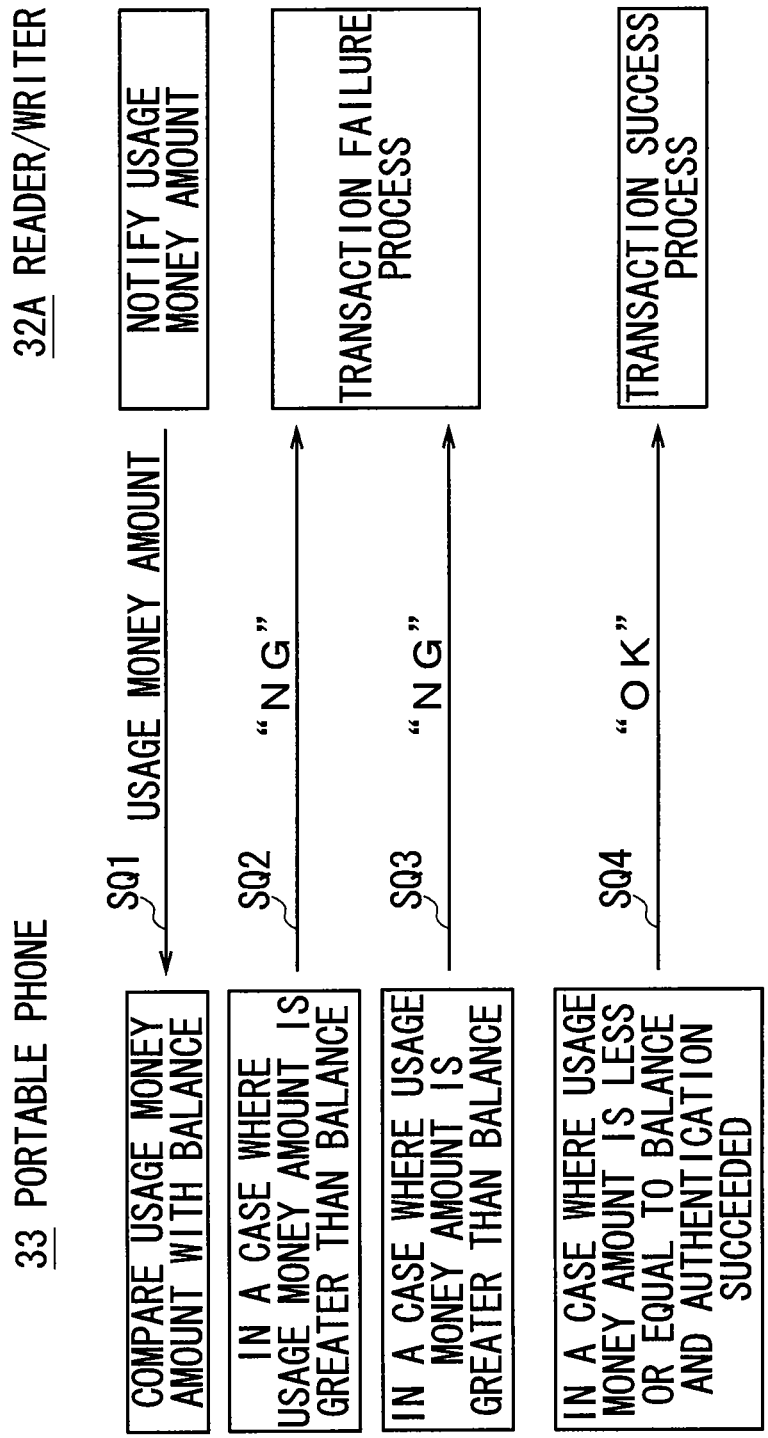
FIG. 13 is a schematic diagram showing a settlement sequence between the reader/writer and the portable phone.

(2-2) User Authentication Process during Settlement Process (2-2-1) Sequence of Settlement In this electronic money system 30, the settlement process on electronic money between the reader/writer 32A and the portable phone 33 is performed in accordance with a sequence of settlement shown in FIG. 13.

When the reader/writer 32A receives from the automatic vending machine 32 a start command which directs the reader/writer 32A to start the electronic settlement process; and a notification which notifies the reader/writer 32A of the amount of money used for purchasing a commercial product (this money amount will be referred to as usage money amount), the reader/writer 32A notifies the portable phone 33 of the usage money amount as a sequence SQ1.

The portable phone 33 compares the usage money amount with the amount of money left on the portable phone 33 (i.e. the balance). When the usage money amount is greater than the balance, the portable phone 33 transmits "NG" indicating insufficient balance to the reader/writer 32A as a sequence SQ2. In response to that, the reader/writer 32A performs a predetermined transaction failure process, and then notifies the automatic vending machine 32 of a result of the process. In this case, the automatic vending machine 32 does not provide the commercial product.

On the other hand, when the usage money amount is less or equal to the balance, the portable phone 33 authenticates the user. When the portable phone 33 fails to authenticate the user, the portable phone 33 transmits "NG" indicating the failure of authentication to the reader/writer 32A as a sequence SQ3. In response to that, the reader/writer 32A performs a predetermined transaction failure process, and then notifies the automatic vending machine 32 of a result of the process. In this case, the automatic vending machine 32 does not provide the commercial product.

In a case in which the usage money amount is less or equal to the balance and the user has been successfully authenticated, the portable phone 33 transmits "OK" indicating the success of authentication to the reader/writer 32A as a sequence SQ4. In response to that, the reader/writer 32A performs a predetermined transaction success process, and then notifies the automatic vending machine 32 of a result of the process. In this case, the automatic vending machine 32 provides the commercial product.

In this manner, based on the sequence shown in FIG. 13, the reader/writer 32A and the portable phone 33 performs a comparison process, which compares the usage money amount with the balance; and the authentication process. Only when the usage money amount is less or equal to the balance and the user has been successfully authenticated, the transaction success process is performed.

(2-2-2) Correspondence Between Usage Money Amount and Security Level of Authentication Method By the way, the electronic money system 30 utilizes various authentication methods. Before the settlement process is performed, one of the authentication methods is selected based on the usage money amount to authenticate the user 4.

Figure 14:
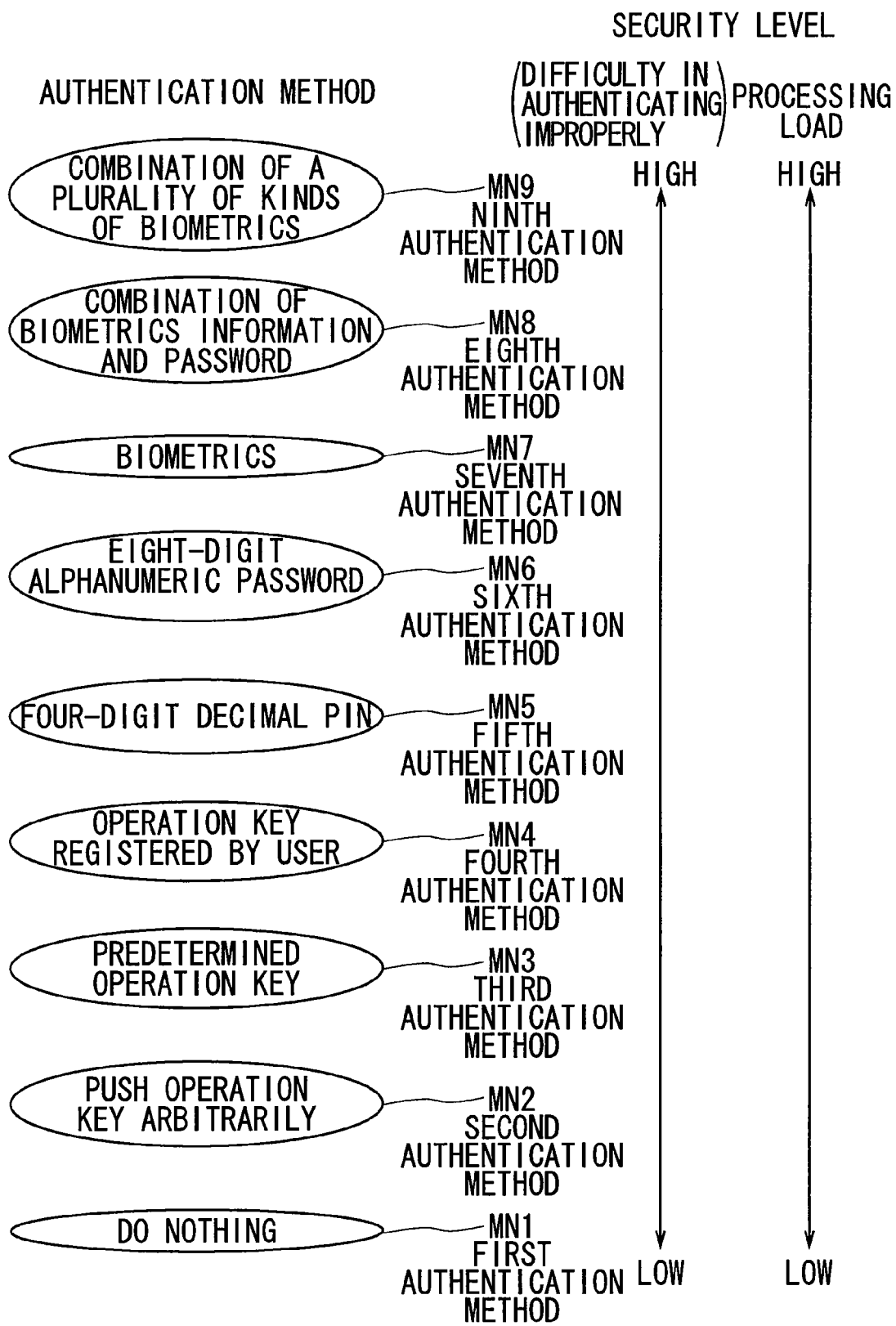
FIG. 14 is a schematic diagram showing an association between the authentication methods and their security levels.

As shown in FIG. 14 (corresponding to FIG. 4), in the electronic money system 30, the security level (i.e. the difficulty of authenticating improperly (or the difficulty of improper authentication)) increases in the following order: a first authentication method MN1 of "Do nothing (which is to say the user 4 just places the portable phone 33 near the reader/writer 32A)"; a second authentication method MN2 of "Push an operation button arbitrarily"; a third authentication method MN3 of "Push a predetermined operation button"; a fourth authentication method MN4 of "An operation button registered by a user"; a fifth authentication method MN5 of "Four-digit decimal PIN"; a sixth authentication method MN6 of "Eight-digit alphanumeric password"; a seventh authentication method MN7 of "Biometrics"; a eighth authentication method MN8 of "Combination of PIN and Biometrics"; and a ninth authentication method MN9 of "Combination of a plurality of kinds of biometrics".

In addition, as shown in FIG. 14, the more the security level on the authentication methods increases, the more complicated the process (such as the check process during the authentication process) will be. As the process gets complicated, the processing load for the authentication process will increase, which means that it takes more time to complete the check process.

In this case, the portable phone 33 supports the first to ninth authentication methods MN1 to MN9. Since the fourth to ninth authentication methods MN4 to MN9 use template data to perform the check process during the authentication process, the portable phone 33 previously asked the user 4 to register his/her template data for the check process by a predetermined registration process. The portable phone 33 stores the template data in the storage section 52.

In the electronic money system 30 according to the second embodiment, the usage money amount is associated with the difficulty of authenticating improperly on the authentication methods, which is different from the above first embodiment.

Figure 12:
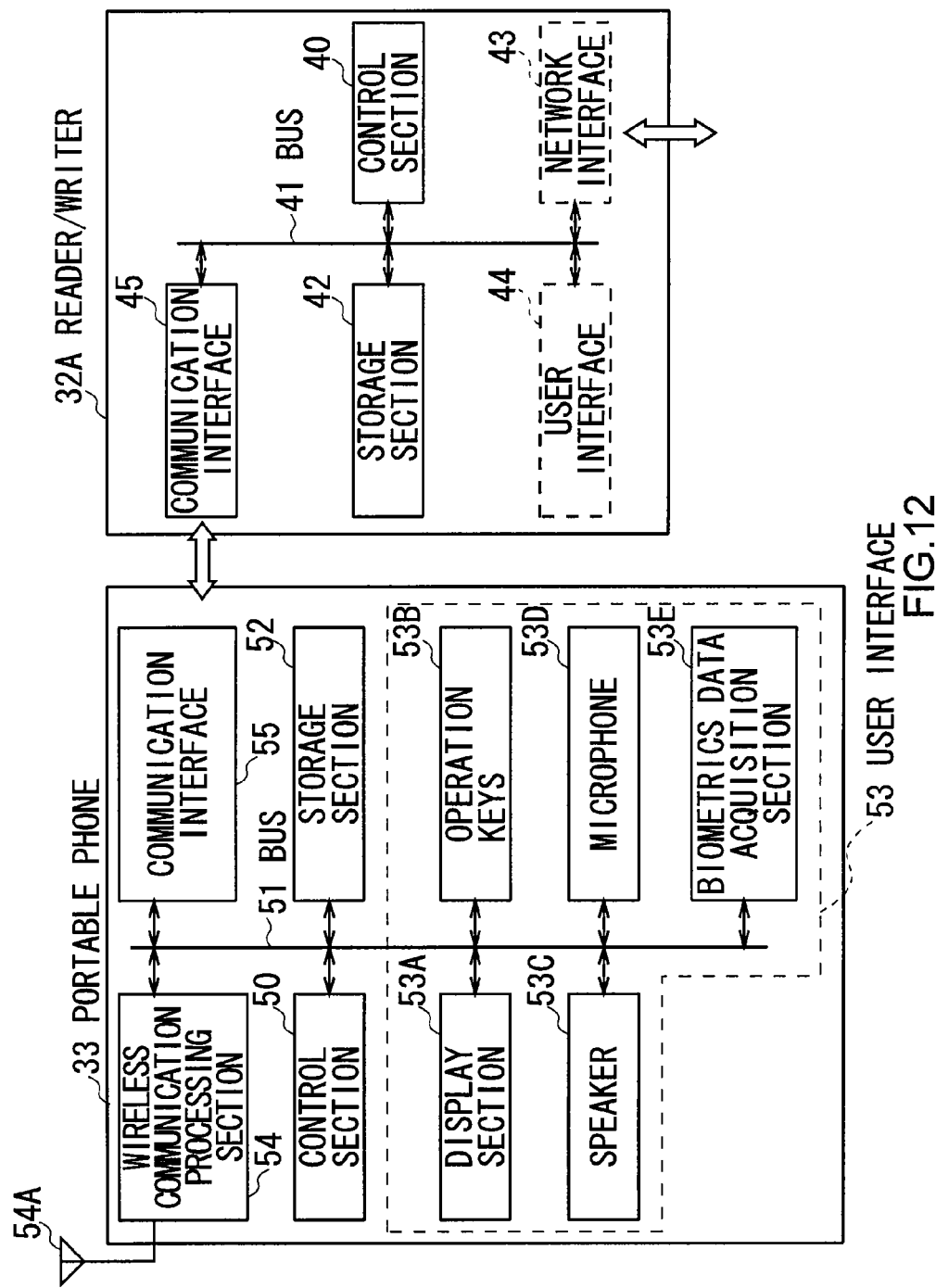
FIG. 12 is a block diagram showing the circuit configuration of a reader/writer and a portable phone.

For example, what FIG. 15 shows is that the fourth authentication method MN4 is used when the usage money amount is at a money amount rank 1 (less than Yen 1,000); the fifth authentication method MN5 is used when the usage money amount is at a money amount rank 2 (greater or equal to Yen 1,000 but less than Yen 10,000); and the seventh authentication method MN7 is used when the usage money amount is at a money amount rank 3 (greater or equal to Yen 10,000). In this manner, the money amount ranks, which correspond to the usage money amount on the portable phone 33, are associated with the authentication methods. This relationship between the money amount ranks and the authentication methods are shown in an authentication method table TBL2 (equivalent to association information). This authentication method table TBL2 was previously stored in the storage section 52 of the portable phone 33 (FIG. 12).

Therefore, when the user 4 tries to use a relatively small amount of money (less than Yen 1,000, for example) to purchase a commercial product (i.e. when the user 4 tries to use the small usage money amount to purchase a commercial product), the portable phone 33 performs the authentication process using the fourth authentication method MN4 because the amount of money the user 4 tries to use is in the range of the money amount rank 1. In this case, the authentication process for the user 4 is done for a short time because the authentication process of the fourth authentication method MN4 ("An operation button registered by a user") is relatively simple. When the user 4 tries to use a relatively large amount of money (greater or equal to Yen 10,000, for example) to purchase a commercial product (i.e. when the user 4 tries to use the large usage money amount to purchase a commercial product), the portable phone 33 performs the authentication process using the seventh authentication method MN7 because the amount of money the user 4 tries to use is in the range of the money amount rank 3. In this case, the user 4 is correctly authenticated because the portable phone 33 performs the authentication process of the seventh authentication method MN4 ("Biometrics") which is relatively complicated and takes time to complete.

Generally, the settlement process on the small amount of money (i.e. the small usage money amount) is not so important for the user 4, while the settlement process on the large usage money amount is relatively important for the user 4. That is to say, as the usage money amount increases, the level of importance for the settlement process increases.

Accordingly, in the authentication method table TBL2 (FIG. 15), as the usage money amount increases (i.e. as the number of money amount rank increases), the security level on the authentication methods increases and the level of importance of the settlement process for the user 4 also increases.

In addition, in response to a user's operation, the portable phone 33 changes the association between the money amount ranks and the authentication methods, or changes the threshold values (such as Yen 1,000, Yen 10,000, or the like) that separate each money amount rank on the authentication method table TBL2 (FIG. 15).

In this case, when the portable phone 33 authenticates the user who wants to change the authentication method table TBL2 as a legitimate user using a predetermined authentication method (which is used when the user tries to change the table), the portable phone 33 changes the authentication method table TBL2 in accordance with user's instructions. By the way, since changing the setting of the authentication method table TBL2 is relatively important, the higher security-level authentication method (the eighth authentication method MN8, for example) is applied as the predetermined authentication method, in this case.

In this manner, the electronic money system 30 authenticates the user 4 using the authentication method associated with the money amount rank corresponding to the usage money amount. That is to say, the security level and the time needed to complete the authentication process vary depending on the level of importance of the settlement process.

(2-3) Settlement Process on Electronic Money

Figure 16:
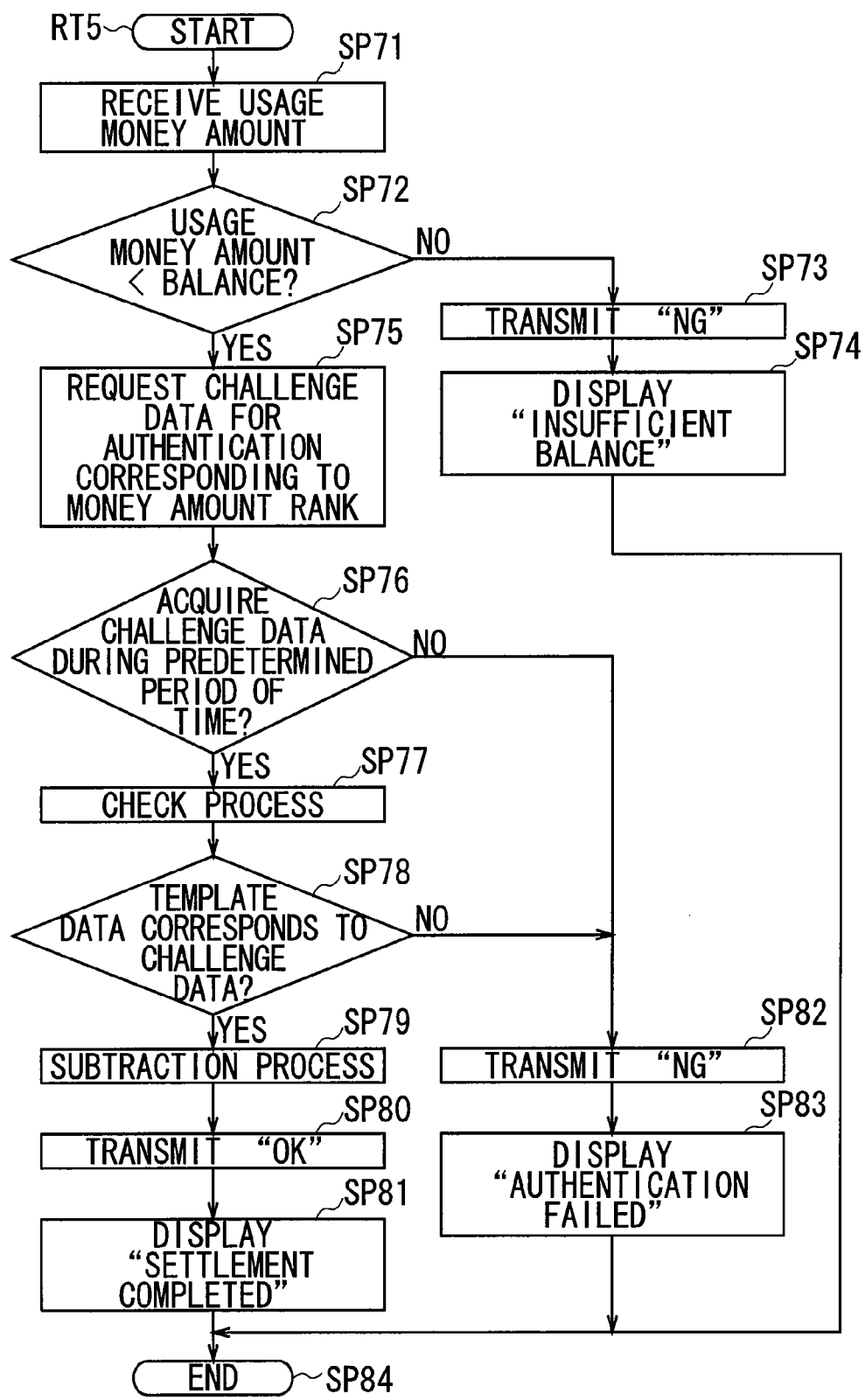
FIG. 16 is a flowchart illustrating a settlement process by the portable phone.

The settlement process is performed between the portable phone 33 and the reader/writer 32A. With reference to a flowchart shown in FIG. 16, a procedure RT5 of the settlement process will be described below.

In this case, for example, the user 4 operates the automatic vending machine 32 to purchase a certain commercial product. At this time, the user 4 holds the portable phone 33 over the reader/writer 32A of the automatic vending machine 32 for electronic money settlement.

When the control section 50 of the portable phone 33 starts to communicate wirelessly with the reader/writer 32A by performing a predetermined wireless communication process, the control section 50 starts the procedure RT5 of the settlement process, and then proceeds to step SP71. At step SP71, the control section 50 of the portable phone 33 receives from the reader/writer 32A through the communication interface 55 information showing the usage money amount (this amount of money corresponds to the price of the commercial product), and then proceeds to next step SP72.

At step SP72, the control section 50 of the portable phone 33 compares the usage money amount (shown in the information received) with the balance memorized in the storage section 52. The control section 50 then determines whether or not the balance is greater than the usage money amount. Negative result at step SP72 means that the balance is insufficient to purchase the commercial product. In this case, the control section 50 of the portable phone 33 proceeds to next step SP73.

At step SP73, the control section 50 of the portable phone 33 transmits "NG" indicating that the settlement has not been completed to the reader/writer 32A through the communication interface 55, and then proceeds to next step SP74.

At step SP74, the control section 50 of the portable phone 33 displays a message showing "Insufficient balance" along with the balance and the usage money amount on the display section 53A, and then proceeds to next step SP84 to end the procedure RT5 of the settlement process. In this case, the reader/writer 32A performs a predetermined transaction failure process. In response to that, the automatic vending machine 32 ends a predetermined sale process without providing the commercial product.

Affirmative result at step SP72 means that the usage money amount is enough to purchase the commercial product. In this case, the control section 50 of the portable phone 33 proceeds to next step SP75.

At step SP75, based on the authentication method table TBL2, the control section 50 of the portable phone 33 determines which money amount rank the usage money amount belongs to. The control section 50 then selects one of the authentication methods in accordance with the money amount rank determined. The control section 50 subsequently asks the user 4 to input challenge data (to be used to authenticate the user 4) corresponding to the selected authentication method, and then proceeds to next step SP76.

At step SP76, the control section 50 of the portable phone 33 determines whether or not the control section 50 acquired the challenge data (to be used to authenticate the user 4) within a predetermined period of time (15 seconds, for example). Negative result at step SP76 means that the control section 50 failed to authenticate the user 4 because the control section 50 failed to acquire the challenge data. In this case, the control section 50 of the portable phone 33 proceeds to next step SP82.

On the other hand, the control section 50 of the portable phone 33 proceeds to next step SP77 when affirmative result is obtained at step SP76.

At step SP77, the control section 50 of the portable phone 33 checks the template data previously stored in the storage section 52 against the challenge data acquired. The control section 50 subsequently proceeds to next step SP78.

At step SP78, the control section 50 of the portable phone 33 determines whether the template data corresponds to the challenge data. Affirmative result at step SP78 means that the user 4 was authenticated as a legitimate user and therefore the settlement is available. In this case, the control section 50 of the portable phone 33 proceeds to next step SP79.

At step SP79, the control section 50 of the portable phone 33 performs a subtraction process to subtract the usage money amount from the balance, and then proceeds to next step SP80.

At step SP80, the control section 50 of the portable phone 33 transmits "OK" indicating that the settlement has been successfully done to the reader/writer 32A, and then proceeds to next step SP81.

At step SP81, the control section 50 of the portable phone 33 displays a message showing "Settlement completed" along with the usage money amount and the updated balance on the display section 53A, and then proceeds to next step SP84 to end the procedure RT5 of the settlement process. In this case, the reader/writer 32A performs a predetermined transaction success process. In response to that, the automatic vending machine 32 ends a predetermined sale process after providing the user 4 with the commercial product.

On the other hand, negative result at step SP78 means that the control section 50 failed to authenticate the user 4 because the template data does not correspond to the challenge data. In this case, the control section 50 of the portable phone 33 proceeds to next step SP82.

At step SP82, the control section 50 of the portable phone 33 transmits "NG" indicating that the settlement has not been completed to the reader/writer 32A through the communication interface 55, and then proceeds to next step SP83.

At step SP83, the control section 50 of the portable phone 33 displays a message showing "Authentication failed" on the display section 53A, and then proceeds to next step SP84 to end the procedure RT5 of the settlement process. In this case, the reader/writer 32A performs a predetermined transaction failure process. In response to that, the automatic vending machine 32 ends a predetermined sale process without providing the commercial product.

(2-4) Authentication Method Table Change Process

Figure 17:
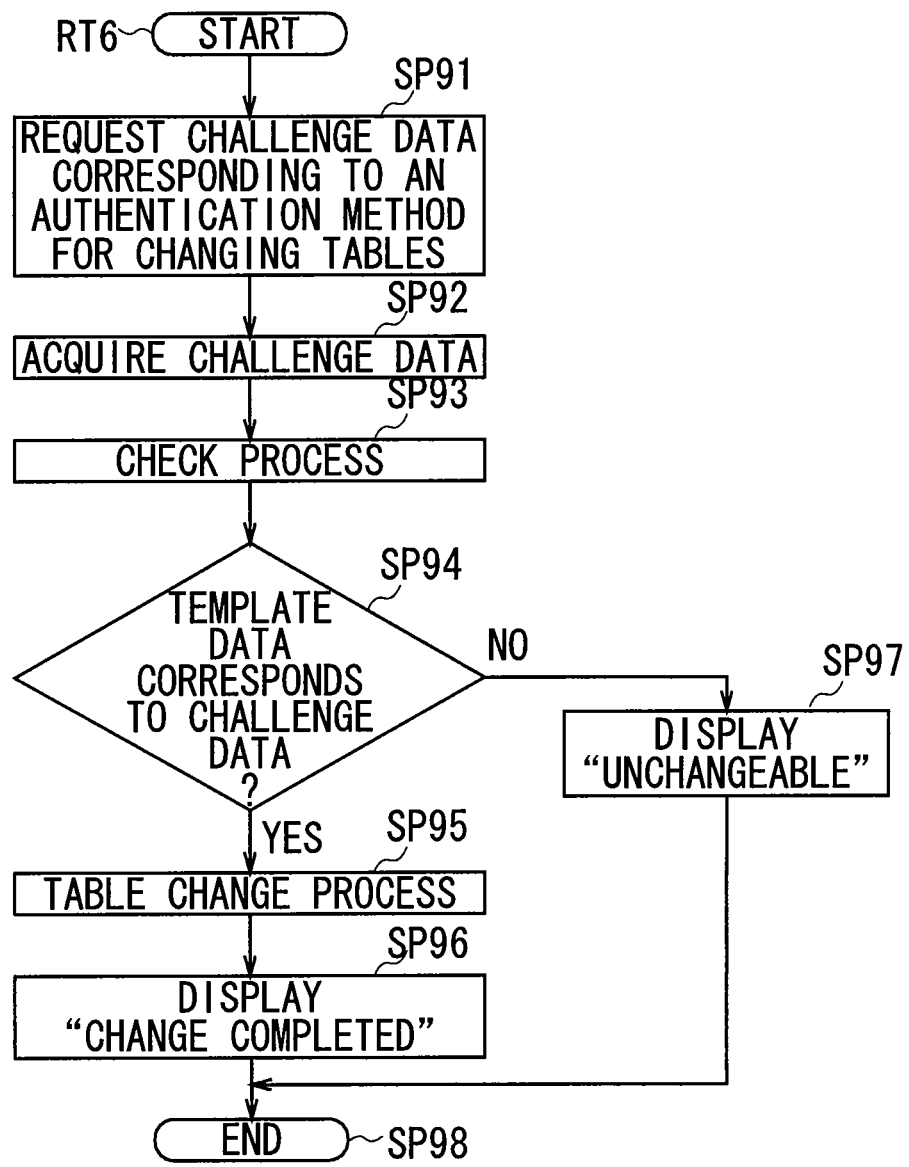
FIG. 17 is a flowchart illustrating an authentication method table change process by the portable phone.

When the user 4 tries to change the setting of the authentication method table TBL stored in the portable phone 33, the portable phone 33 performs a setting change process. With reference to a flowchart shown in FIG. 17, a procedure RT6 of the setting change process will be described below.

When the control section 50 of the portable phone 33 accepts from the user 4 a command that directs the portable phone 33 to change the authentication methods set previously, the control section 50 starts the procedure RT6 of the setting change process and then proceeds to step SP91.

At step SP91, the control section 50 of the portable phone 33 asks the user 4 to input the challenge data corresponding to the authentication method (the eighth authentication method MN8 and the like, for example) to be used to authenticate the user 4 to change the authentication method table. The control section 50 subsequently proceeds to next step SP92.

At step SP92, the control section 50 of the portable phone 33 acquires the challenge data input by the user 4, and then proceeds to next step SP93.

At step SP93, the control section 50 of the portable phone 33 checks the template data stored in the storage section 52 against the challenge data acquired, and then proceeds to next step SP94.

At step SP94, the control section 50 of the portable phone 33 determines whether or not the template data corresponds to the challenge data. Affirmative result at step SP94 means that the control section 50 can change the authentication method table TBL2 in accordance with the instructions input by the user 4 because the user 4 has been authenticated successfully. In this case, the control section 50 of the portable phone 33 proceeds to next step SP95.

At step SP95, the control section 50 of the portable phone 33 displays a predetermined Graphical User Interface (GUI) on the display section 53A to allows the user 4 to select some authentication method and the like. In response to that, the control section 50 changes the authentication methods associated with each money amount rank on the authentication method table TBL2 (FIG. 15), or changes the threshold values (such as Yen 1,000, Yen 10,000, or the like) that separate each money amount rank. The control section 50 subsequently proceeds to next step SP96.

At step SP96, the control section 50 of the portable phone 33 displays a message such as "Change completed" on the display section 53A to let the user 4 know the fact that the procedure of changing the authentication method table has been completed. And then the control section 50 proceeds to next step SP98 to end the procedure RT6 of the authentication method table change process.

Negative result at step SP94 means that the control section 50 will not change the setting of the authentication method table in accordance with the instructions input by the user 4 because the control section 50 failed to authenticate the user 4. In this case, the control section 50 of the portable phone 33 proceeds to next step SP97.

At step SP97, the control section 50 of the portable phone 33 displays a message such as "Unchangeable" on the display section 53A to let the user 4 know the fact that the authentication method table has not been changed. After that the control section 50 proceeds to next step SP98 to end the procedure RT6 of the authentication method table change process.

(2-5) Operation and Effect

When the user 4 utilizes the electronic money capability of the portable phone 33 to purchase a commercial product from the automatic vending machine 32, the electronic money system 30 with the above configuration follows the authentication method table TBL2 (FIG. 15) where the usage money amount is associated with the levels of security on the authentication methods, and then utilizes one of the authentication methods corresponding to the money amount rank (to which the usage money amount belongs) to authenticate the user 4.

When the portable phone 33 authenticated the user 4 as a legitimate user, the portable phone 33 completes a purchase process on the commercial product by completing the settlement process with the reader/writer 32A of the automatic vending machine 32. By contrast, the portable phone 33 stops purchasing the commercial product by stopping the settlement process, when the portable phone 33 did not authenticate the user 4 as a legitimate user.

In this manner, the electronic money system 30 selects one of the authentication methods based on the authentication method table TBL2 to authenticate the user 4. Therefore, the electronic money system 30 can select an appropriate security-level authentication method in accordance with the level of importance of the settlement process.

In this case, the electronic money system 30 selects a lower security-level authentication method (the fourth authentication method MN4, for example) when the usage money amount is relatively small (less than Yen 1,000, for example). This reduces the processing load of the authentication process for the user 4, and therefore the authentication process can be completed for a short time.

Accordingly, when the electronic money system 30 performs the settlement process with a relatively small amount of money, this settlement does not take a long time. This increases the usability because the user 4 does not have to wait for a long time.

By contrast, the electronic money system 30 selects a higher security-level authentication method (the seventh authentication method MN7, for example) when the usage money amount is relatively large (greater or equal to Yen 10,000, for example). This means that the user 4 is authenticated accurately. That is to say, this prevents an unfair use of the portable phone 33, such as identity-theft scams by a third party.

Therefore, when the electronic money system 30 performs the settlement process with a relatively large amount of money, the electronic money system 30 authenticates the user 4 accurately. This ensures a high level of security, and provides the user 4 who performs the procedure of the settlement with a sense of safety.

In this manner, the electronic money system 30 selects one of the authentication methods based on the usage money amount to provide the user 4 with a sense of security and easiness depending on the usage money amount. This ensures both the security and usability of the electronic money system 30.

In addition, in the electronic money system 30, the user 4 can change the setting of the authentication method table TBL2 stored in the portable phone 33. Therefore, the authentication methods can be associated with each money amount rank in accordance with a request from the user 4.

Therefore, the user 4 can carefully change the setting of the authentication method table. For example, when the user 4 puts importance on the usability rather than the security, the user 4 changes the association between the authentication methods and the money amount ranks such that the security level of each money amount rank is decreased by two levels. When the user 4 puts importance on the security level only when he/she uses a large amount of money (i.e. when the usage money amount is large), the user 4 changes the association between the authentication methods and the money amount ranks such that the money amount ranks 2 and 3 (FIG. 16) are associated with the highest security-level ninth authentication method MN9.

In this manner, the electronic money system 30 according to the second embodiment has the above configuration. Therefore, when the user 4 uses the electronic money capability of the portable phone 33, the electronic money system 30 authenticates the user 4 using the authentication method selected in accordance with the authentication method table TBL2 where the money amount ranks of the usage money amount are associated with the authentication methods. Therefore, the level of security and the time needed to complete the authentication process varies depending on the level of importance of the settlement process.

(3) Other Embodiments

In the above-noted first embodiment, in the authentication method table TBL1 (FIG. 5), the operation instruction of withdrawing money is associated with the use of the four-digit numeric PIN; the operation instruction of changing lock conditions is associated with the use of the fingerprint pattern; and the operation instruction of unlocking is associated with the use of the vein pattern. However, the present invention is not limited to this. For example, in the authentication method table TBL1, the operation instructions may be associated with other authentication methods, insofar as the difficulty of authenticating improperly (on the authentication methods) will increase as the importance of the operation instructions increases, and the processing load for the check process will decrease as the importance decreases. For example, the operation instruction of unlocking may be associated with the use of "Combination of biometrics information and passwords"; and the operation instruction of changing the PIN may be associated with the use of an eight-digit alphanumeric password.

In addition, in the above-noted first embodiment, when someone tries to withdraw money of more than the transaction limit from the saving account, the system automatically locks the saving account. However, the present invention is not limited to this. For example, when the withdrawal of money is performed a predetermined number of times (five times, for example) or more during a predetermined period of time (a week, for example), the system may automatically lock the saving account (i.e. there is a limited number of withdrawals per week, in this case).

Figure 18:
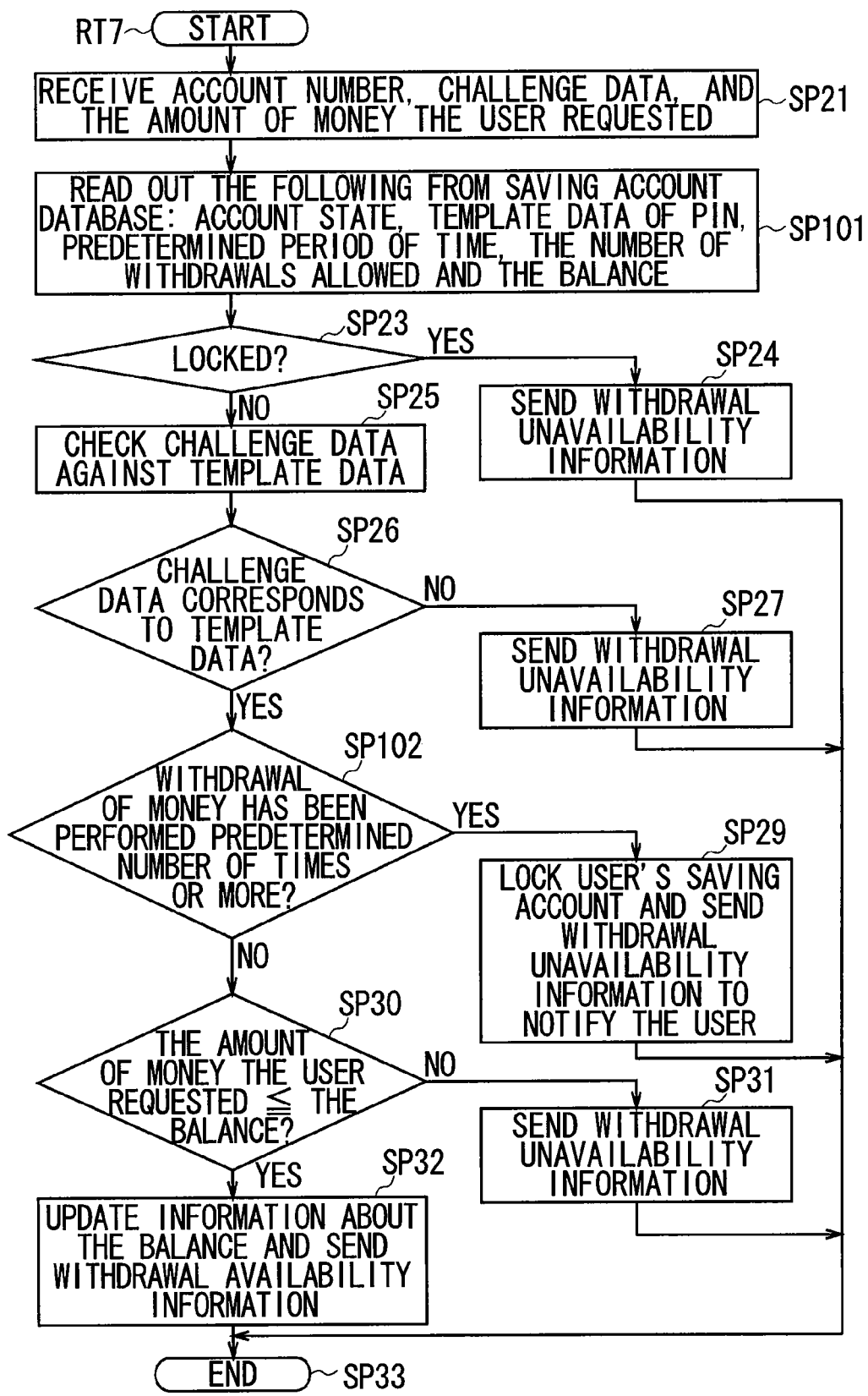
FIG. 18 is a flowchart illustrating a money withdrawal process (1) according to another embodiment.

In this case, for example, the user 4 previously placed a restriction on the number of withdrawals allowed (five times, in this case) and set the predetermined period of time (a week, in this case). The saving account database, which is stored in the database storage area 12B (FIG. 2) of the host computer 2, stores these settings with history data. In addition, the control section 10 of the host computer 2 performs a procedure RT7 of the money withdrawal process as shown in FIG. 18 (the parts of FIG. 18 have been designated by the same reference numerals and marks as the corresponding parts of FIG. 8) instead of the procedure RT2 of the money withdrawal process.

In the procedure RT7 of the money withdrawal process, the control section 10, at step SP 101 (FIG. 18) which corresponds to step SP22 (FIG. 8), reads out the following information from the saving account database stored in the database storage area 12B (FIG. 2): the account state on the target saving account (either the normal state or the lock state); the template data of the PIN; the predetermined period of time; the number of withdrawals allowed; and the balance. At step SP102 (FIG. 18) which corresponds to step SP28 (FIG. 8), the control section 10 determines whether or not the withdrawal of money has been performed the predetermined number of times (equivalent to the number of withdrawals allowed, which was read out from the saving account database) or more during the predetermined period of time. Affirmative result at step SP102 means that there is a high possibility that an unauthorized user tries to withdraw money from this saving account. In this case, the control section 10 proceeds to next step SP29 to lock the saving account.

In this manner, based on the number of withdrawals during the predetermined period of time, the ATM system 1 locks the saving account. In a case in which an unauthorized user tries to withdraw money little by little to finally acquire a large amount of money, the ATM system 1 locks the saving account to stop the withdrawals.

In addition, in this case, the user can set both the predetermined period of time and the number of withdrawals allowed. However, the user may set only the number of withdrawals allowed without changing the predetermined period of time. Alternatively, the user may set only the predetermined period of time without changing the number of withdrawals allowed.

Furthermore, in the above-noted first embodiment, when someone tries to withdraw money of more than the transaction limit from the saving account, the system automatically locks the saving account. However, the present application is not limited to this. For example, when the total amount of money withdrawn reaches a predetermined amount of money (Yen 80,000 for example) or more during a predetermined period of time (a week, for example), the system may automatically lock the saving account.

Figure 19:
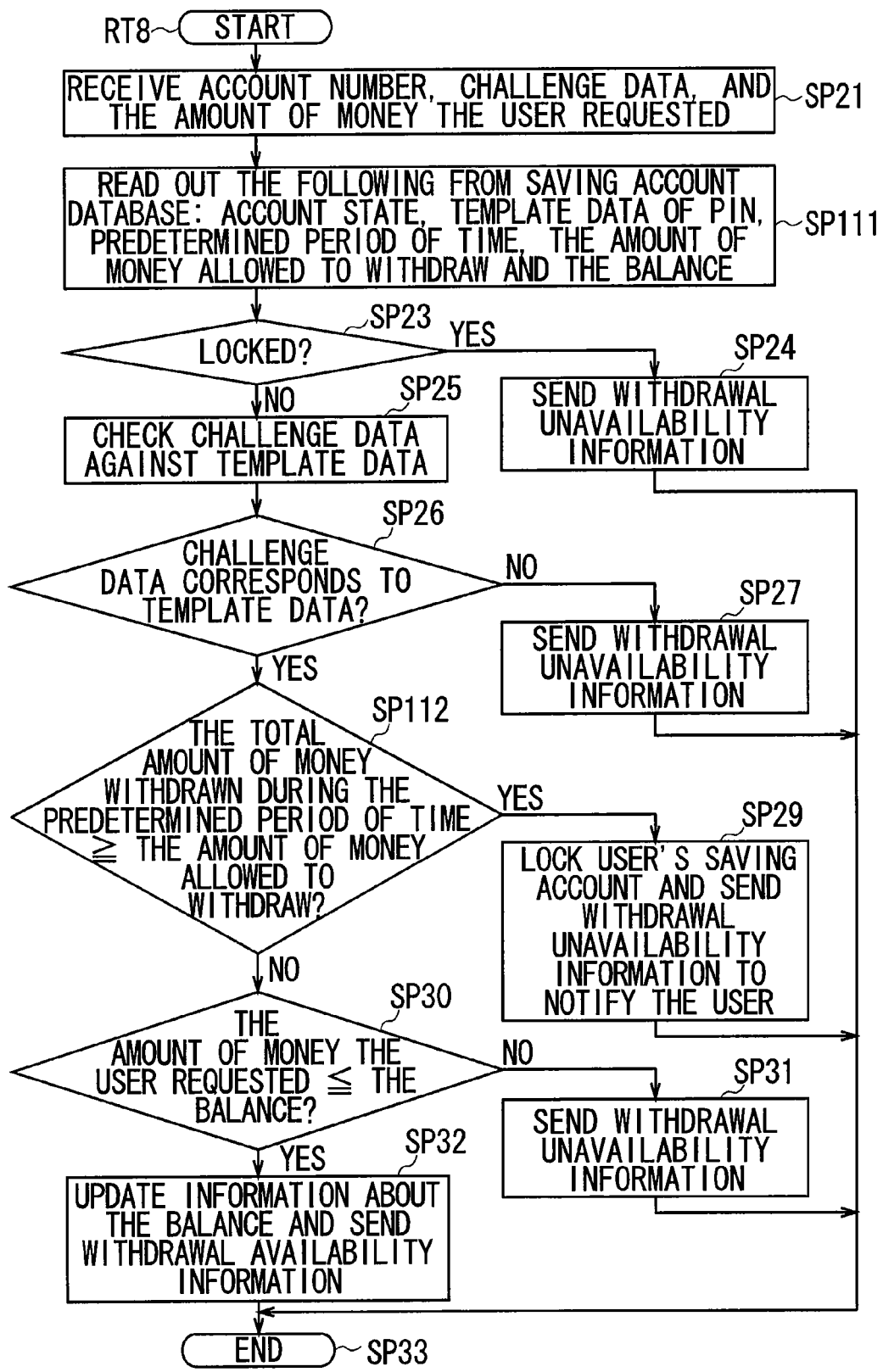
FIG. 19 is a flowchart illustrating a money withdrawal process (2) according to another embodiment.

In this case, for example, the user 4 previously placed a restriction on the total amount of money allowed to withdraw (Yen 80,000, in this case) and set the predetermined period of time (a week, in this case). The saving account database, which is stored in the database storage area 12B (FIG. 2) of the host computer 2, stores these settings with history data. In addition, the control section 10 of the host computer 2 performs a procedure RT8 of the money withdrawal process as shown in FIG. 19 (the parts of FIG. 19 have been designated by the same reference numerals and marks as the corresponding parts of FIG. 8) instead of the procedure RT2 of the money withdrawal process.

In the procedure RT8 of the money withdrawal process, the control section 10, at step SP 111 (FIG. 19) which corresponds to step SP22 (FIG. 8), reads out the following information from the saving account database stored in the database storage area 12B (FIG. 2): the account state on the target saving account; the template data of the PIN; the predetermined period of time; the total amount of money allowed to withdraw; and the balance. At step SP112 (FIG. 19) which corresponds to step SP28 (FIG. 8), the control section 10 determines whether or not the total amount of money withdrawn reaches the predetermined amount of money (equivalent to the total amount of money allowed to withdraw, which was read from the saving account database) or more during the predetermined period of time. Affirmative result at step SP112 means that there is a high possibility that an unauthorized user tries to withdraw money from this saving account. In this case, the control section 10 proceeds to next step SP29 to lock the saving account.

In this manner, based on the total amount of money withdrawn during the predetermined period of time, the ATM system 1 locks the saving account. In a case in which an unauthorized user tries to withdraw money little by little to finally acquire a large amount of money, the ATM system 1 locks the saving account to stop the withdrawals.

In addition, in this case, the user can set both the predetermined period of time and the total amount of money allowed to withdraw. However, the user may set only the total amount of money allowed to withdraw without changing the predetermined period of time. Alternatively, the user may set only the predetermined period of time without changing the total amount of money allowed to withdraw.

In addition, the ATM system 1 decides to lock the saving account based on one of the following conditions: whether or not the amount of money requested by the user reaches the transaction limit; whether or not the withdrawal of money has been performed the predetermined number of times or more during the predetermined period of time; or whether or not the total amount of money withdrawn reaches the predetermined amount of money or more during the predetermined period of time. However, the present invention is not limited to this. The ATM system 1 can combine those conditions.

Furthermore, in the above-noted first embodiment, when the host computer 2 locks the saving account at step SP29 in the procedure RT2 (FIG. 8) of the money withdrawal process, the host computer 2 sends an e-mail to notify the legitimate user of the fact that the saving account has been locked. However, the present invention is not limited to this. For example, the system may notify the user of that fact through a fax machine, a voice service by phone companies, and the like; or the system may not notify the user of that fact. In this case, the user may be allowed to choose one of these notification means.

Furthermore, in the above-noted second embodiment, based on the procedure RT5 of the settlement process (FIG. 16), the system authenticates the user after being notified of the usage money amount by the reader/writer 32A. However, the present invention is not limited to this. For example, the system may start to communicate with the reader/writer 32A after authenticating the user.

Figure 20:
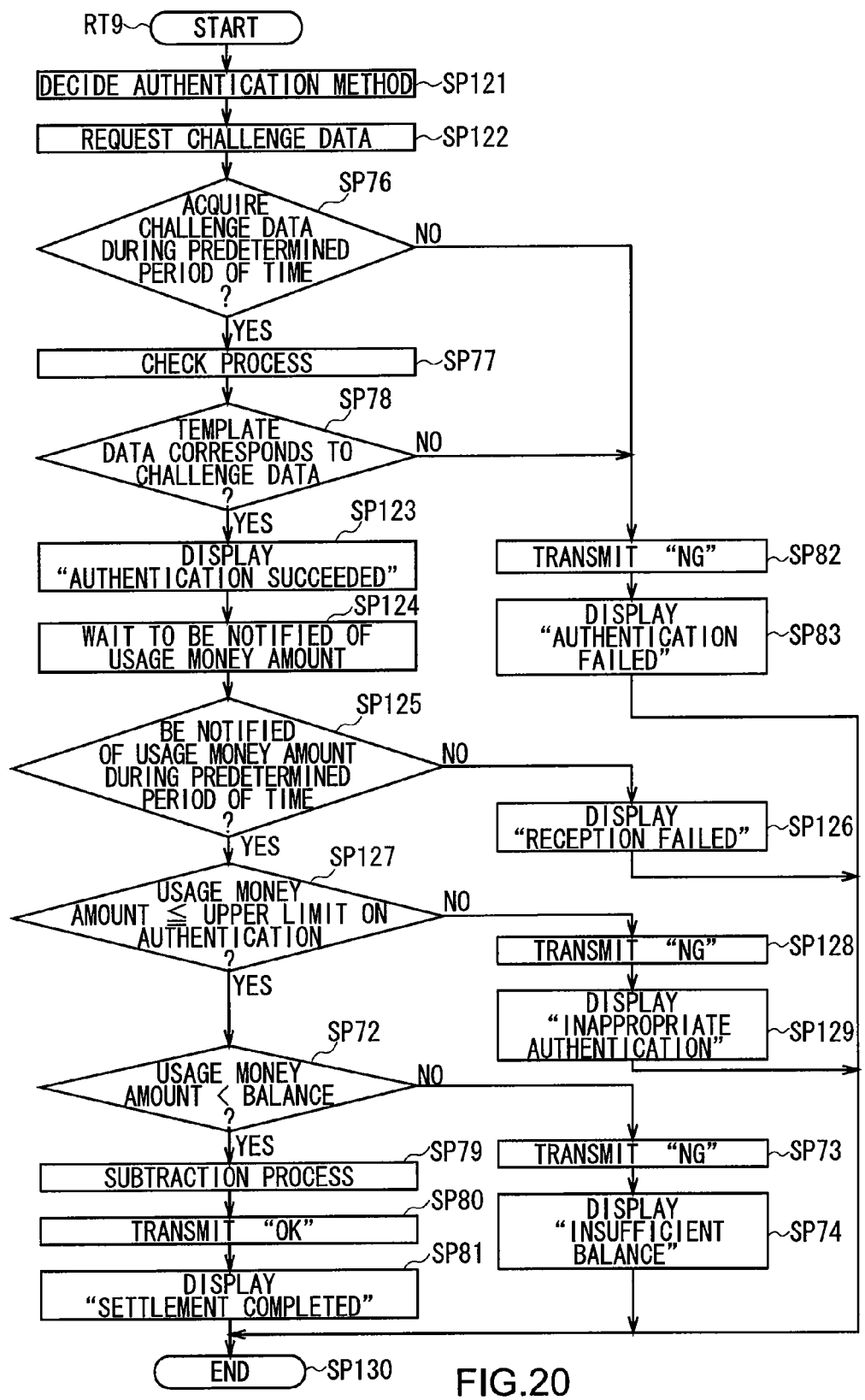
FIG. 20 is a flowchart illustrating a settlement process according to another embodiment.

In this case, the portable phone 33 may perform the settlement process based a procedure RT9 of the settlement process (FIG. 20). The parts of the procedure RT9 have been designated by the same reference numerals and marks as the corresponding parts of the procedure RT5 of the settlement process. In response to a predetermined user's operation, the control section 50 of the portable phone 33 starts the procedure RT9 of the settlement process, and then proceeds to step SP121.

At step SP121, the control section 50 of the portable phone 33 lets the user 4 decide the authentication method, and then proceeds to next step SP122. Alternatively, the control section 50 may let the user 4 input the amount of money to be used, and decide the authentication method using the authentication method table TBL2 (FIG. 15) based on the input.

At step SP122, the control section 50 of the portable phone 33 asks the user 4 to input the challenge data, and then performs the process of step SP76 to SP78. And then, when affirmative result is obtained at step S78, the control section 50 proceeds to next step SP123 to display a message such as "Authentication succeeded" on the display section 53A. The control section 50 subsequently proceeds to next step SP124, and then waits till the reader/writer 32A notifies the control section 50 of the usage money amount. And then the control section 50 proceeds to next step SP125.

At step SP125, the control section 50 of the portable phone 33 determines whether or not the reader/writer 32A has notified the control section 50 of the usage money amount during a predetermined period of time (30 seconds, for example). When negative result is obtained at step SP125, the control section 50 of the portable phone 33 proceeds to step SP126, and then displays a message such as "Reception Failed (Notification Failed)" on the display section 53A. The control section 50 subsequently proceeds to step SP130 to end the procedure RT9 of the settlement process.

By contrast, when affirmative result is obtained at step SP125, the control section 50 of the portable phone 33 proceeds to next step SP127, and then determines whether or not the usage money amount is less than an upper limit of the money amount rank associated with the authentication method used to authenticate the user. Affirmative result at step SP127 means that the usage amount money was appropriate for the authentication method used to authenticate the user. In this case, the control section 50 of the portable phone 33 performs the process of step SP72, and then performs the process of step SP79 to SP81, or step SP73 and SP74. After that, the control section 50 of the portable phone 33 proceeds to step SP130 to end the procedure RT9 of the settlement process.

Negative result at step SP127 means that the usage amount money was not appropriate for the authentication method used to authenticate the user. In this case, the control section 50 of the portable phone 33 proceeds to step SP128, and then transmits "NG" indicating that the settlement has not been completed to the reader/writer 32A. The control section 50 of the portable phone 33 subsequently proceeds to step SP129, and then displays a message such as "Inappropriate authentication" on the display section 53A. Then, the control section 50 proceeds to step SP130 to end the procedure RT9 of the settlement process.

By the way, in the procedure RT9 of the settlement process, when negative result is obtained at step SP127, the control section 50 may authenticate the user again using the authentication method corresponding to the usage money amount after completing the process of step SP128 and SP129. When the user is authenticated, the control section 50 may proceed to step SP72.

Furthermore, in the above-noted second embodiment, there are three money amount ranks on the authentication table TBL2 (FIG. 15). However, the present application is not limited to this. There may be two money amount ranks, or four or more money amount ranks. In addition, the user 4 may set or change the number of the money amount ranks.

Furthermore, in the above-noted second embodiment, as shown in FIG. 13, each money amount rank is associated with one of the first to ninth authentication methods MN1 to MN9. However, the present application is not limited to this. Other kinds of authentication methods, such as a combination of an eight-digit alphanumeric password and biometrics, can be associated with the money amount rank. The number of authentication methods is not limited to nine. The number of authentication methods can be eight or less, or ten or more.

Furthermore, in the above-noted second embodiment, the user directly inputs the challenge data (which is used to authenticate the user) through the portable phone 33. However, the present invention is not limited to this. For example, an interface through which the challenge data can be input may be equipped with the user interface 44 of the reader/writer 32A of the automatic vending machine 32, and the challenge data input through the user interface 44 may be used to authenticate the user. In this case, the control section 50 of the portable phone 33 or the control section 40 of the reader/writer 32A may perform the check process of the authentication process.

Furthermore, in the above-noted second embodiment, the settlement process is performed by the portable phone 33 having the electronic money capability. However, the present application is not limited to this. For example, the settlement process may be performed by an IC card or Personal Digital Assistant (PDA) having the electronic money capability.

Furthermore, in the above-noted first embodiment, the biological information such as the fingerprint pattern and the vein pattern of the palm is used to authenticate the user. However, the present application is not limited to this. The biological information may include other information such as iris patterns and voice patterns. The biological information such as iris patterns and voice patterns can be also applied to the second embodiment. In this case, the portable phone 33 equipped with a camera may acquire the iris pattern through the camera, or acquire the voice pattern through the microphone 53D.

Furthermore, in the above-noted first embodiment, the ATM system 1 is divided into two machines: the host computer 2 and the ATM 3. However, the present application is not limited to this. The host computer 2 and the ATM 3 can be integrated into one machine.

Furthermore, in the above-noted first embodiment, the template data, which is used to authenticate the user, is stored in the storage section 12 of the host computer 2. However, the present application is not limited to this. The template data may be stored in the IC chip 5A of the cash card 5.

Furthermore, in the above-noted first embodiment, the host computer 2 performs the check process during the authentication process. However, the present application is not limited to this. The ATM 3 may perform the check process.

Furthermore, in the above-noted first embodiment, the host computer 2 performs the procedure RT2 of the money withdrawal process (FIG. 8) and the procedure RT4 of the unlock process (FIG. 10) using the saving account management program stored in the program storage area 12A of the storage section 12. However, the present application is not limited to this. The saving account management program may be stored in other storage media such as the ROM (not shown) of the control section 10. Alternatively, the saving account management program may be stored in removable storage media such as CD-ROMs or "MEMORY STICK (Registered Trademark of Sony Corporation)". In this case, the host computer 2 executes the saving account management program read out from the CD-ROMs or "MEMORY STICK (Registered Trademark of Sony Corporation)" through a drive (not shown) for CD-ROMs or a slot (not shown) for "MEMORY STICK (Registered Trademark of Sony Corporation)". The host computer 2 may acquire the saving account management program from other server apparatus (not shown) through the network interface 14. In this case, the host computer 2 may restore the saving account management program by uncompressing compressed data or executing an install program.

In the above-noted embodiments, the ATM 3 performs the procedure RT1 of the operation instruction acceptance process (FIG. 7) using the saving account management program stored in the storage section 22. However, the present application is not limited to this. The saving account management program may be stored in removable storage media. Alternatively, the ATM 3 may acquire the saving account management program from external server apparatus (not shown) and the like through a network interface (not shown).

Furthermore, in the above-noted second embodiment, the control section 50 of the portable phone 33 performs the procedure RT5 of the settlement process (FIG. 16) using the settlement processing program stored in the storage section 52. However, the present application is not limited to this. The settlement processing program may be stored in removable storage media such as "MEMORY STICK (Registered Trademark of Sony Corporation)". In this case, the control section 50 executes the settlement processing program read out from the "MEMORY STICK (Registered Trademark of Sony Corporation)" through a slot (not shown) for "MEMORY STICK (Registered Trademark of Sony Corporation)". The control section 50 may acquire the settlement processing program from a base station (not shown) through the wireless communication processing section 54, the communication interface 55, or the like. Alternatively, the control section 50 may acquire the settlement processing program from the reader/writer 32A of the automatic vending machine 32. In this case, the control section 50 may restore the settlement processing program by uncompressing compressed data or executing an install program.

Furthermore, in the above-noted first embodiment, the ATM system 1, which is equivalent to an authentication system, includes the storage section 12, which is equivalent to a storage section; the control section 20, which is equivalent to a selection section; and the control section 10, which is equivalent to an authentication section. In addition, in the above-noted second embodiment, the electronic money system 30, which is equivalent to an authentication system, includes the storage section 52, which is equivalent to a storage section; and the control section 50, which is equivalent to a selection section and an authentication section. However, the present application is not limited to these embodiments. The authentication system may include other circuit components, which are equivalent to the storage section, the selection section and the authentication section.

Furthermore, in the above-noted first embodiment, the host computer 2 and the ATM 3, which are equivalent to authentication apparatus, include the storage section 12, which is equivalent to a storage section; the control section 20, which is equivalent to a selection section and a process execution section; and the control section 10, which is equivalent to an authentication section. In addition, in the above-noted second embodiment, the portable phone 33, which is equivalent to authentication apparatus, includes the storage section 52, which is equivalent to a storage section; the control section 50, which is equivalent to a selection section, an authentication section and a process execution section. However, the present application is not limited to these embodiments. The authentication apparatus may include other circuit components, which are equivalent to the storage section, the selection section, the authentication section and the process execution section.

The system, apparatus, method and program according to an embodiment of the present application can be applied to an online system which authenticates a user when he/she tries to input various operation instructions.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A machine for performing an authentication procedure comprising:
   at least one input device;
   at least one display device;
   at least one processor; and
   at least one memory device which stores a plurality of instructions, which when executed by the at least one processor, cause the at least one processor to operate with the at least one input device and the at least one display device to:
   (a) store association information where a second plurality of instructions for individual data are associated with authentication methods, the authentication methods used to authenticate a user, said individual data being previously individually allocated to a legitimate user, and said individual data includes saving account data generated based on a saving account of the legitimate user;
   (b) select, based on said association information, the authentication method corresponding to the instruction input by a user, wherein a first authentication method to includes a withdrawal of money instruction input and a second authentication method, different and exclusive from the first authentication method, to includes a change lock condition instruction input;

(c) after selecting said authentication method, authenticate the user as the legitimate user based on a result of checking challenge data obtained from the user for the check against template data previously registered as authentication information for the legitimate user, wherein the individual data is set to a lock state when the instruction input by the user meets a lock condition, the saving account being unavailable for any withdrawal when the individual data is set to the lock state; and (d) execute a process in accordance with said instruction when the user is authenticated as the legitimate user, wherein the process changes the lock condition when said instruction is the change lock condition instruction input, wherein the change lock condition instruction input includes a change to a transaction limit of the saving account.

2. The machine according to claim 1, wherein the first authentication method is a Personal Identification Number authentication method and the second authentication method is a biological information authentication method.

3. The machine according to claim 1, wherein a third authentication method is a biological information authentication method corresponding to an unlock instruction input.

4. The machine according to claim 3, wherein the first authentication method is a Personal Identification Number authentication method, the second authentication method is a fingerprint authentication method, and the third authentication method is a palm-vein pattern authentication method.

5. An authentication apparatus comprising:
at least one input device;
at least one display device;
at least one processor; and
at least one memory device which stores a plurality of instructions, which when executed by the at least one processor, cause the at least one processor to operate with the at least one input device and the at least one display device to:

(a) store association information where a second plurality of instructions for individual data is associated with authentication methods, the authentication methods used to authenticate a user, said individual data being previously individually allocated to a legitimate user, and said individual data includes saving account data generated based on a saving account of the legitimate user;

(b) select, based on said association information, the authentication method corresponding to the instruction input by a user, wherein a Personal Identification Number authentication method to includes a withdrawal of money instruction input and a biological information method, different and exclusive from the Personal Identification Number authentication method, to includes a change lock condition instruction input;

(c) after selecting said authentication method, authenticate the user as the legitimate user based on a result of checking challenge data obtained from the user for the check against template data previously registered as authentication information for the legitimate user, wherein the individual data is set to a lock state when the instruction input by the user meets a lock condition, the saving account being unavailable for any withdrawal when the individual data is set to the lock state; and (d) execute a process in accordance with said instruction when the user is authenticated as the legitimate user, wherein the process changes the lock condition when said instruction is the change lock condition instruction input, wherein the change lock condition instruction input includes a change to a transaction limit of the saving account.

6. The authentication apparatus according to claim 5, wherein
said second plurality of instructions are associated with said authentication methods on said association information such that a difficulty of improper authentication in which other users are mistakenly authenticated as the legitimate user by said authentication method increases as an importance of said instruction increases.

7. The authentication apparatus according to claim 5, wherein
said second plurality of instructions are associated with said authentication methods on said association information such that a processing load for the check process by said authentication method decreases as an importance of said instruction decreases.

8. The authentication apparatus according to claim 5, further comprising
association information change means for changing said association information based on the instruction by the user when the user is authenticated as the legitimate user by a predetermined authentication method.

9. The authentication apparatus according to claim 5, wherein
said instruction is an instruction related to an operation for said saving account data; and
the individual data locks, when said instruction related to the operation is an instruction dealing with an amount of money greater or equal to a transaction limit previously set for said saving account data, said saving account data to prohibit monetary transactions until said authentication section accepts a legitimate unlock instruction.

10. The authentication apparatus according to claim 9, wherein
when said instruction related to the operation is a money withdrawal instruction for said saving account data, said authentication section checks said challenge data equivalent to information input by the user through a key against said template data equivalent to input information previously registered; and
wherein when said instruction related to the operation is an unlock instruction that directs said locked saving account data to be unlocked or a transaction limit change instruction that directs said transaction limit to be changed, said processor is configured to execute the plurality of instructions to challenge data equivalent to biological information of the user against said template data equivalent to biological information previously registered to authenticate the user as a legitimate user.

11. The authentication apparatus according to claim 9, wherein
when said saving account data is locked, said processor is configured to execute the plurality of instructions to inform a point of contact of the legitimate user previously associated with said saving account data that said saving account data was locked.

12. The authentication apparatus according to claim 5, wherein
said individual data is electronic money data showing electronic money generated electronically based on an amount of money a user has;

said instruction is an instruction related to a settlement process involving said electronic money;

said processor is configured to execute the plurality of instructions to store said association information where an amount of money of said settlement process is associated with said authentication methods; and said selection section selects, based on said association information, one of said authentication methods in accordance with said amount of money of the settlement process.

13. The authentication apparatus according to claim 12, wherein said processor is configured to execute the plurality of instructions to store said association information where money amount ranks are associated with said authentication methods, said money amount ranks being generated by classifying said amount of money of the settlement process into a plurality of ranks;

said processor is configured to execute the plurality of instructions to select selects, based on said association information, one of said authentication methods in accordance with the money amount ranks by which said amount of money of the settlement process is classified.

14. The authentication apparatus according to claim 13, further comprising association information change means for changing, based on an instruction from the user, an association between said money amount ranks and said authentication methods on said association information when the user is authenticated as the legitimate user by a predetermined authentication method.

15. The authentication apparatus according to claim 13, further comprising association information change means for changing, based on an instruction from the user, threshold values by which said money amount ranks are classified on said association information when the user is authenticated as the legitimate user by a predetermined authentication method.

16. The authentication apparatus according to claim 5, wherein the at least one processor operates to:

receive an account state of the saving account from an external account database, the account state indicating whether the saving account is in the lock state.

17. An authentication method comprising:

causing a processor to execute a plurality of instructions to operate with at least one input device and at least one display device to:

(a) select, based on association information where a second plurality of instructions for individual data previously allocated to a legitimate user individually is associated with authentication methods which are to be used to authenticate a user, the authentication method corresponding to the instruction input by a user, and said individual data includes saving account data generated based on a saving account of the legitimate user, wherein a first authentication method to includes a withdrawal of money instruction input and a second authentication method, different and exclusive from the first authentication method, to includes a change lock condition instruction input;

(b) set the individual data to a lock state when the instruction input by the user meets a lock condition, the saving account being unavailable for any withdrawal when the individual data is set to the lock state;

(c) authenticate the user as the legitimate user based on a result of checking challenge data obtained from the user for the check against template data previously registered as authentication information for the legitimate user; and (d) execute a process in accordance with said instruction when the user is authenticated as the legitimate user, wherein the executed process changes the lock condition when said instruction is the change lock condition instruction input, wherein the change lock condition instruction input includes a change to a transaction limit of the saving account.

18. A non-transitory computer-readable medium storing an authentication program for causing an information processing apparatus including:

at least one input device;

at least one display device;

at least one processor; and at least one memory device which stores a plurality of instructions, which when executed by the at least one processor, cause the at least one processor to operate with the at least one input device and the at least one display device to execute:

(a) a selection step of selecting, based on association information where a second plurality of instructions for individual data previously allocated to a legitimate user individually is associated with authentication methods which are to be used to authenticate a user, the authentication method corresponding to the instruction input by a user, and said individual data includes saving account data generated based on a saving account of the legitimate user, wherein a Personal Identification Number authentication method to includes a withdrawal of money instruction input and a biological information method, different and exclusive from the Personal Identification Number authentication method, to includes a change lock condition instruction input;

(b) an authentication step of following said authentication method selected to authenticate the user as the legitimate user based on a result of checking challenge data obtained from the user for the check against template data previously registered as authentication information for the legitimate user, wherein said authentication step includes setting the individual data to a lock state when the instruction input by the user meets a lock condition, the saving account being unavailable for any withdrawal when the individual data is set to the lock state; and (c) a process execution step of executing a process in accordance with said instruction when the user is authenticated as the legitimate user, wherein the executed process changes the lock condition when said instruction is the change lock condition instruction input, wherein the change lock condition instruction input includes a change to a transaction limit of the saving account.

* * * * *